United States Patent
Mise et al.

(10) Patent No.: US 8,493,493 B2
(45) Date of Patent: Jul. 23, 2013

(54) IMAGING APPARATUS, IMAGING APPARATUS CONTROL METHOD, AND COMPUTER PROGRAM

(75) Inventors: Tetsuo Mise, Tokyo (JP); Hiroyuki Nemoto, Kanagawa (JP); Eiji Shintaku, Tokyo (JP); Manabu Yamauchi, Tokyo (JP); Toshiki Ono, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/607,188

(22) Filed: Sep. 7, 2012

(65) Prior Publication Data

US 2013/0002537 A1      Jan. 3, 2013

Related U.S. Application Data

(63) Continuation of application No. 12/358,917, filed on Jan. 23, 2009.

(30) Foreign Application Priority Data

Jan. 25, 2008  (JP) ................. 2008-014455
Jul. 24, 2008  (JP) ................. 2008-190505

(51) Int. Cl.
  *H04N 5/222*    (2006.01)
  *H04N 5/445*    (2006.01)
  *G03B 17/18*    (2006.01)
(52) U.S. Cl.
  USPC ........ 348/333.02; 348/345; 348/346; 396/52; 396/296

(58) Field of Classification Search
  USPC ................. 348/333.02, 349; 396/52
  See application file for complete search history.

(56) References Cited

U.S. PATENT DOCUMENTS

| 5,119,121 | A | | 6/1992 | Kobayashi et al. | |
|---|---|---|---|---|---|
| 5,532,783 | A | | 7/1996 | Kusaka | |
| 5,621,495 | A | * | 4/1997 | Yamamoto et al. | 396/89 |
| 5,899,586 | A | | 5/1999 | Kawanami | |
| 6,097,898 | A | * | 8/2000 | Hamada et al. | 396/147 |
| 7,372,486 | B2 | | 5/2008 | Shinohara et al. | |
| 7,403,705 | B2 | * | 7/2008 | Onozawa | 396/147 |
| RE41,222 | E | | 4/2010 | Hirai | |

(Continued)

FOREIGN PATENT DOCUMENTS

| CN | 1629714 A | 6/2005 |
|---|---|---|
| CN | 1716078 A | 1/2006 |

(Continued)

*Primary Examiner* — Clayton E LaBalle
*Assistant Examiner* — Leon W Rhodes, Jr.
(74) *Attorney, Agent, or Firm* — Oblon, Spivak, McClelland, Maier & Neustadt, L.L.P.

(57) ABSTRACT

An imaging apparatus includes: a control unit configured to move a focusing lens, and detect a focus position; wherein the control unit executes auto-focus (AF) scan processing in which only a part of a range of movement of the focusing lens is set as a scan range, as first scan processing, and executes auto-focus (AF) scan processing in which a region including a region differing from the scan region of the first scan processing is set as a scan range, as second scan processing, in the event that a focus point is not detected in the first scan processing.

23 Claims, 18 Drawing Sheets

U.S. PATENT DOCUMENTS

| | | |
|---|---|---|
| 7,801,433 B2 | 9/2010 | Funaki et al. |
| 7,999,874 B2 | 8/2011 | Iwasaki |
| 8,027,581 B2 | 9/2011 | Mise et al. |
| 2005/0168620 A1 | 8/2005 | Shiraishi |
| 2005/0200729 A1 | 9/2005 | Sasagawa et al. |
| 2005/0216862 A1* | 9/2005 | Shinohara et al. ............ 715/825 |
| 2006/0066744 A1 | 3/2006 | Stavely et al. |
| 2007/0058064 A1* | 3/2007 | Hara et al. ............... 348/333.01 |
| 2007/0077046 A1* | 4/2007 | Lim ................................ 396/52 |
| 2007/0247545 A1 | 10/2007 | Yamada et al. |
| 2007/0285528 A1 | 12/2007 | Mise et al. |
| 2007/0286589 A1 | 12/2007 | Ishiwata et al. |
| 2008/0013851 A1 | 1/2008 | Ishiwata et al. |
| 2008/0143866 A1 | 6/2008 | Nakahara |
| 2011/0134273 A1 | 6/2011 | Mise et al. |

FOREIGN PATENT DOCUMENTS

| | | |
|---|---|---|
| CN | 1815341 A | 8/2006 |
| JP | 9-211298 | 8/1997 |
| JP | 10-213737 | 8/1998 |
| JP | 2000-147368 | 5/2000 |
| JP | 2003-230039 | 8/2003 |
| JP | 2003-241069 | 8/2003 |
| JP | 2003-262786 | 9/2003 |
| JP | 2004-109150 | 4/2004 |
| JP | 2004-133637 | 4/2004 |
| JP | 2005-202064 | 7/2005 |
| JP | 2005-260792 | 9/2005 |
| JP | 2006-18246 | 1/2006 |
| JP | 2007-206433 | 8/2007 |

* cited by examiner

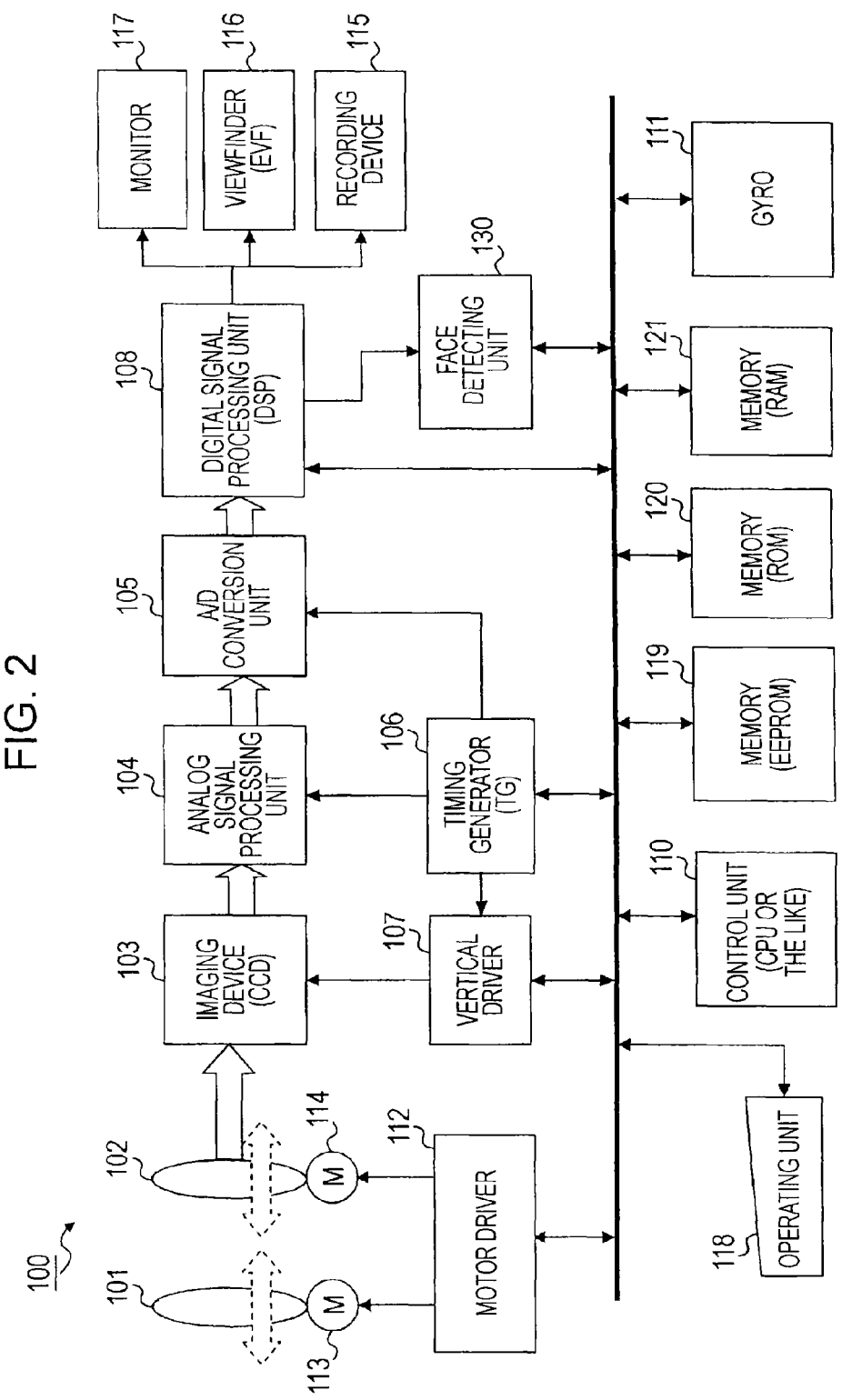

(a) BRIGHT ENVIRONMENT    (b) ENVIRONMENT WITH LOW LUMINANCE (a) MAGNIFYING GLASS REGION    (b) NEAR REGION (MACRO REGION)    (c) FAR REGION

60% EMISSION    80% EMISSION    100% EMISSION

IMAGING APPARATUS, IMAGING APPARATUS CONTROL METHOD, AND COMPUTER PROGRAM

CROSS REFERENCES TO RELATED APPLICATIONS

This application is a continuation of U.S. application Ser. No. 12/358,917, filed Jan. 23, 2009, and is based upon and claims the benefit of priority from Japanese Application JP 2008-014455 filed Jan. 25, 2008, and Japanese Application JP 2008-190505 filed Jul. 24, 2008, the entire contents of each of which are incorporated herein by reference.

BACKGROUND OF THE INVENTION

1. Field of the Invention

The present invention relates to an imaging apparatus, imaging apparatus control method, and computer program. More particularly, the present invention relates to an imaging apparatus, imaging apparatus control method, and computer program, which perform focus control.

2. Description of the Related Art

With a great number of current imaging apparatuses nowadays such as still cameras, video cameras, and so forth, an auto-focus (AF) mechanism is implemented, which automatically focuses on a subject. For example, with focus control based on contrast measurement employed for many cameras, a focus position is determined by determining whether the contrast of imaged data obtained through a lens is high or low. That is to say, a position where the contrast intensity of an image becomes the maximum is detected while moving a focusing lens, and this position is regarded as a focus position.

Note that a range where the focusing lens is moved is referred to as a scan range, and lens driving is typically performed with a range between the near side and the infinity side as a scan range. Multiple sampling points which are contrast measurement points are set on the scan range, so as to determine a focus position.

With shooting employing auto-focus (AF), lens driving is generally performed with a range between the near side and the infinity side as a scan range, which results in a problem that it takes time to determine a focus position. That is, there is a shortcoming that a longer scan range means a longer focus driving length or amount for focusing, in turn meaning an increased number of sampling points for scanning AF, leading to more time for focal point adjustment. This is particularly marked with cases of using high-power optical systems with long focal distances.

In order to avoid such problems, configurations have been proposed wherein the entire range of the near side to the far side is not taken as the scan range, and rather only a partial section thereof is set as the scan range, i.e., the lens driving range, which is used as the focal position.

For example, Japanese Unexamined Patent Application Publication No. 9-211298, Japanese Unexamined Patent Application Publication No. 2003-262786, Japanese Unexamined Patent Application Publication No. 2003-230039, and Japanese Unexamined Patent Application Publication No. 2005-202064 disclose a configuration wherein the focusing lens driving range is divided into a near range and far range, reducing the overall time to focusing in scanning AF.

Specifically, Japanese Unexamined Patent Application Publication No. 9-211298 discloses a configuration wherein the moving region of the focusing lens is sectioned into a movable region and move-inhibited region, thereby restricting the driving range. Japanese Unexamined Patent Application Publication No. 2003-262786 discloses a configuration wherein the scan range is divided, and scanning AF is performed restricted to the one range specified by the user, for example.

Japanese Unexamined Patent Application Publication No. 2003-230039 discloses a configuration wherein a distance specifying button for restricting the photography range is provided, and the AF scan range is restricted in accordance with input form the distance specifying button. Japanese Unexamined Patent Application Publication No. 2005-202064 also discloses a configuration for restricting the scan range to reduce focusing time. Thus, multiple techniques have been disclosed regarding configurations for reducing the processing time of auto-focus (AF) by restricting the scan range.

Also, some cameras nowadays are capable of performing photography switched to an optimal photography mode in accordance with the distance to the subject. For example, there are cameras which have a macro mode suitable for photography in a near region (macro region) which is in the order of tens of centimeters to the subject, a magnifying glass mode suitable for even closer photography in a very near region (magnifying glass region) which is in the order of several centimeters to the subject, and so on. With photography in these modes, photography is performed with a focus limit set in which the focus region is set to a particular range.

With cameras having such modes, there is a technique whereby a user is notified by way of icons whether the current focus position is in the macro region or the magnifying glass region. Also, while Japanese Unexamined Patent Application Publication No. 2003-241069 and Japanese Unexamined Patent Application Publication No. 2005-260792 disclose arrangements wherein a warning is displayed regarding whether the mode will be a normal photography mode or macro photography mode based on measured distance information, issuing such a warning can often lead to missing a photo opportunity.

Also, with compact cameras with no distance measurement sensors or the like, image processing AF is independently used, so distance measurement has to be found out from the focusing lens position when monitoring AF or scanning AF is performed and focus is achieved. Scanning AF operations build on so-called auto-macro operations where the mode automatically makes transition to the macro mode upon detection that the subject is at a close position (macro region). Accordingly, there is no focus limit for each region as with the above-mentioned Japanese Unexamined Patent Application Publication No. 2003-241069 and Japanese Unexamined Patent Application Publication No. 2005-260792, so poor photos are seldom obtained.

Apparatuses provided with such auto-macro functions often calculate the current position from monitoring AF information before half-pressing the release button and make a display regarding whether or not the subject is in a macro region (i.e., displaying a tulip icon) based on that information. However, such icon display processing is primarily based on focus information from during monitoring AF, and may result in trouble such as, in the event of the user changing the angle by panning, tilting, zooming, or the like, just before the time of shooting, the monitoring AF requires time to catch up, resulting in inappropriate icons, or no icon being displayed even though the focus position is in the macro region or magnifying glass region.

Also, there are cameras which perform control to emit AF illuminator for shooting in the event that sufficient light is not available. However, many of such cameras are configured to perform photography emitting light of the same intensity regardless of whether the subject is in the macro region or magnifying glass region, or the normal far region, meaning that the light is often excessive when in the macro region or magnifying glass region, and further electric power is excessively consumed.

SUMMARY OF THE INVENTION

Many cameras nowadays use functions in which the faces of subjects are detected and focus control is performed on the faces. Performing face detection means that the camera continuously executes face detection processing and executes processing for calculating the general distance to the face. By using focus information from monitoring of the obtained image of the camera, distance estimation information as to the subject can be obtained. It has been found desirable to provide an imaging apparatus, imaging apparatus control method, and computer program, whereby accurate focusing processing can be realized quickly by selectively applying information usable in various camera modes while performing auto-focusing, such as face detection information, monitoring information, and so forth, and executing setting for an optimal AF scan range. It has also been found desirable to provide an imaging apparatus, imaging apparatus control method, and computer program, wherein electric power consumption can be suppressed by executing light emission control of AF illuminator in accordance with distance to the subject.

According to an embodiment of the present invention, an imaging apparatus includes: a control unit configured to move a focusing lens, and detect a focus position; wherein the control unit executes auto-focus (AF) scan processing in which only a part of a range of movement of the focusing lens is set as a scan range, as first scan processing, and executes auto-focus (AF) scan processing in which a region including a region differing from the scan region of the first scan processing is set as a scan range, as second scan processing, in the event that a focus point is not detected in the first scan processing.

The scan range of the first scan processing and the scan range of the second scan processing may include an overlapped region.

The control unit may execute scan processing in which only nearby a focusing lens position where nearby distance to a face detected by face detection processing is a focal distance, is set as a scan range, as the first scan processing.

The control unit may execute scan processing in which the entire range of movement of the focusing lens is set as a scan range, as the second scan processing.

The control unit may calculate a subject distance which is an estimated distance to a subject which is to be photographed, execute the first scan processing by moving the focusing lens in only one direction from a scan start position, the scan start position being the position of the focusing lens where nearby the calculated subject distance is a focal distance, and in the event that a focus point is not detected in the first scan processing, second scan processing may be executed in which a region including a region other than the scan processing region of the first scan processing is set as a scan range.

The control unit may calculate the subject distance by the expression subject distance $(m)$=(focal distance)×(height of subject)/(height of imager)/1000.

The control unit may execute scan processing in which only nearby a focusing lens position where nearby distance to a subject obtained by monitoring processing of images acquired by the imaging apparatus is a focal distance, is set as a scan range, as the first scan processing.

The control unit may execute second scan processing in which only a part of a range of movement of the focusing lens which also includes the scan region of the first scan is set as a scan range, in the event that a focus point is not detected in the first scan processing, and execute third scan processing in which a region other than the scan processing range in the second scan processing is set as a scan range, in the event that a focus point is not detected in the second scan processing.

The control unit may calculate a subject distance which is an estimated distance to a subject which is to be photographed, by the expression subject distance $(m)$=(focal distance)×(height of subject)/(height of imager)/1000, execute the second scan processing by moving the focusing lens in only one direction from a scan start position, the scan start position being the position of the focusing lens where nearby the calculated subject distance is a focal distance, and in the event that a focus point is not detected in the second scan processing, execute third scan processing in which a region including a region other than the scan processing region of the second scan processing is set as a scan range.

The control unit may start the first scan processing from a boundary between a far region and a near region set beforehand, and start the second scan processing from a boundary between a near region and a magnifying glass region set beforehand.

The boundary between a far region and a near region, and the boundary between a near region and a magnifying glass region, may be stipulated by cam curves.

The control unit may determine whether the subject distance is in the far region, near region, or magnifying glass region, and perform display control of icons for identifying which region the subject is in.

The control unit may detect movement of the imaging apparatus, and perform control so that the icons are not displayed in the event that movement has been detected.

The control unit may determine whether the subject distance is in the far region, near region, or magnifying glass region, and control light emission intensity of AF illuminator in accordance to which region the subject is in, such that in the event that the subject distance is in the near region or magnifying glass region, the light emission intensity of AF illuminator is lowered as compared to a case wherein the subject distance is in the far region.

The control unit may perform control to display AF illuminator icons on a display unit, whereby the level of control of light emission intensity of AF illuminator can be identified.

According to an embodiment of the present invention, an imaging apparatus control method executed in an imaging apparatus includes the steps of: a control unit executing focus control including moving a focusing lens, and detecting a focus position; the focus control further including first scan processing in which is executed auto-focus (AF) scan processing wherein only a part of a range of movement of the focusing lens is set as a scan range, and second scan processing in which is executed auto-focus (AF) scan processing wherein a region including a region differing from the scan region of the first scan processing is set as a scan range, as second scan processing, in the event that a focus point is not detected in the first scan processing.

The scan range of the first scan processing and the scan range of the second scan processing may include an overlapped region.

The first scan processing may be scan processing in which only nearby a focusing lens position where nearby distance to a face detected by face detection processing is a focal distance, is set as a scan range.

The second scan processing may be scan processing in which the entire range of movement of the focusing lens is set as a scan range.

The first scan processing may be scan processing of moving the focusing lens in only one direction from a scan start position, the scan start position being the position of the focusing lens where nearby the calculated subject distance is a focal distance, and the second scan processing may be scan processing in which a region including a region other than the scan processing region of the first scan processing is set as a scan range.

The subject distance may be calculated by the expression subject distance ($m$)=(focal distance)×(height of subject)/(height of imager)/1000.

The first scan processing may be scan processing in which only nearby a focusing lens position where nearby distance to a subject obtained by monitoring processing of images acquired by the imaging apparatus is a focal distance, is set as a scan range.

Second scan processing may be scan processing executed in which only a part of a range of movement of the focusing lens which also includes the scan region of the first scan is set as a scan range; and third scan processing may be scan processing executed in which a region other than the scan processing range in the second scan processing is set as a scan range.

Second scan processing may be scan processing executed in which a subject distance which is an estimated distance to a subject which is to be photographed is calculated by the expression subject distance ($m$)=(focal distance)×(height of subject)/(height of imager)/1000 with the focusing lens being moved in only one direction from a scan start position, the scan start position being the position of the focusing lens where nearby the calculated subject distance is a focal distance; and third scan processing may be scan processing executed in which a region including a region other than the scan processing region of the second scan processing is set as a scan range.

The control unit may start the first scan processing from a boundary between a far region and a near region set beforehand, and start the second scan processing from a boundary between a near region and a magnifying glass region set beforehand.

The boundary between a far region and a near region, and the boundary between a near region and a magnifying glass region, may be stipulated by cam curves.

The control unit may determine whether the subject distance is in the far region, near region, or magnifying glass region, and perform display control of icons for identifying which region the subject is in.

The control unit may detect movement of the imaging apparatus control method, and perform control so that the icons are not displayed in the event that movement has been detected.

The control unit may determine whether the subject distance is in the far region, near region, or magnifying glass region, and control light emission intensity of AF illuminator in accordance to which region the subject is in, such that in the event that the subject distance is in the near region or magnifying glass region, the light emission intensity of AF illuminator is lowered as compared to a case wherein the subject distance is in the far region.

The control unit may perform control to display AF illuminator icons on a display unit, whereby the level of control of light emission intensity of AF illuminator can be identified.

According to an embodiment of the present invention, a computer program for executing an imaging apparatus control operation in an imaging apparatus includes the steps of: a control unit executing focus control including moving a focusing lens, and detecting a focus position; the focus control further including first scan processing in which is executed auto-focus (AF) scan processing wherein only a part of a range of movement of the focusing lens is set as a scan range, and second scan processing in which is executed auto-focus (AF) scan processing wherein a region including a region differing from the scan region of the first scan processing is set as a scan range, as second scan processing, in the event that a focus point is not detected in the first scan processing.

Note that the computer program according to an embodiment of the present invention is, for example, a computer program which can be provided with a storage medium or communication medium which is provided in a computer-readable format as to a general-purpose computer system which can execute various program codes. Such a program is provided in a computer-readable format, whereby processing corresponding to the program can be realized on a computer system.

Further objects, features, and advantages of the present invention will become apparent from the later-described embodiments of the present invention and the attached drawings. Note that system as used in the present specification is a logical group configuration of multiple devices, and is not restricted to each component device being within the same housing.

With the above configuration, in focus control where a focusing lens is moved to detect a focus position, first scan processing in which only a part of a range of movement of the focusing lens is set as a scan range, and second scan processing in which a region including a region differing from the scan region of the first scan processing is set as a scan range in the event that a focus point is not detected in the first scan processing, are executed. The scan range in the first scan processing can be set using subject distance information and the like obtained by face detection information or monitoring information, which enables effective focus processing. Also, in the event that a focus point is not obtained in the first scan processing, the second scan processing is executed, thereby realizing more certain focus processing.

BRIEF DESCRIPTION OF THE DRAWINGS

FIG. 2 is a diagram for describing an example of a hardware configuration of the imaging apparatus according to an embodiment of the present invention;

DESCRIPTION OF THE PREFERRED EMBODIMENTS

Description will be made regarding the details of an imaging apparatus, imaging apparatus control method, and computer program, according to an embodiment of the present invention, with reference to the drawings.

Figure 1A:
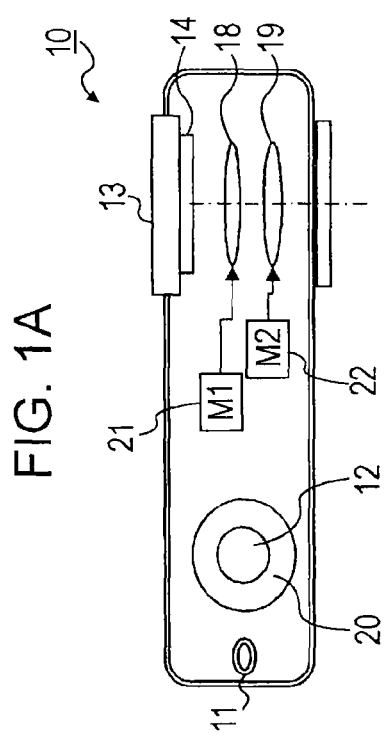
FIGS. 1A through 1C are diagrams for describing an example of an external view of an imaging apparatus according to an embodiment of the present invention.
Figure 1C:
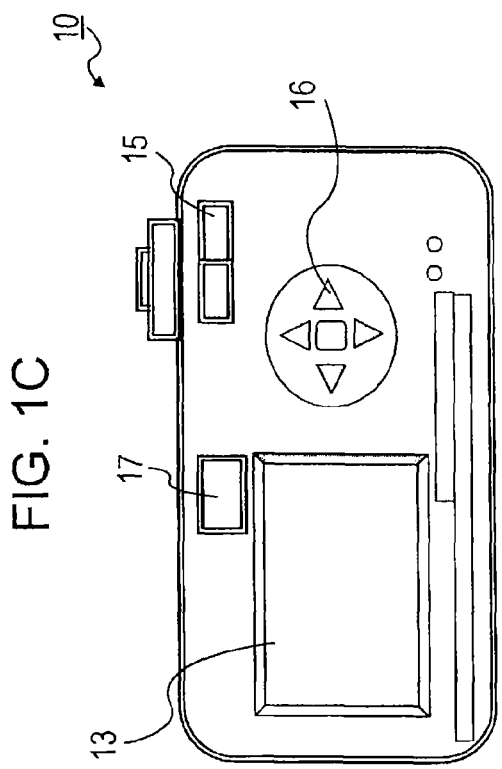
Figure 1B:
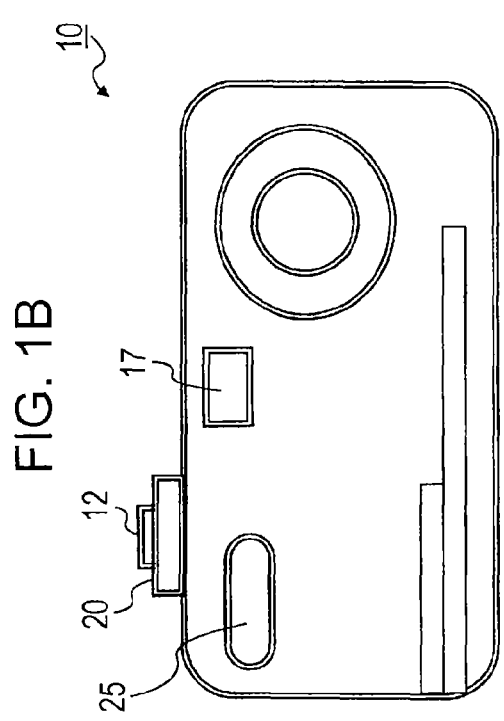

First, description will be made regarding a configuration example of an imaging apparatus according to an embodiment of the present invention, with reference to FIGS. 1A through 2. FIGS. 1A through 1C are diagrams illustrating the external view of an imaging apparatus 10 according to an embodiment of the present invention. FIG. 1A shows a top view of the imaging apparatus 10, FIG. 1B shows a front view, and FIG. 1C shows a rear view. A lens portion of the top view in FIG. 1A is illustrated as a cross-sectional view. The imaging apparatus 10 includes a power supply switch 11, release switch 12 serving as a trigger for setting image capturing timing, i.e., a shutter, monitor 13 for displaying an image (through image) shot by the image apparatus, operating information, or the like, imager 14 serving as an imaging device (CCD), zoom button 15 for performing zoom control, operating buttons 16 for inputting various types of operating information, viewfinder 17 for confirming an image (through image) shot by the imaging apparatus, focusing lens 18 driven with focus adjustment, zoom lens 19 driven at the time of zoom adjustment, mode dial 20 for setting a shooting mode, focusing lens motor (M1) 21 for driving the focusing lens 18, and a zoom lens motor (M2) 22 for driving the zoom lens 19. The imaging apparatus 10 further includes an AF illuminator emission unit 25 for casting light on the subject in the event that the shooting environment is a low-illuminance environment.

A subject image is displayed on the viewfinder 17 and monitor 13. The viewfinder 17 and monitor 13 are configured of, for example, an LCD, and a subject image through the lens is projected as a moving image. This moving image is called a through image. A user confirms the viewfinder 17 or monitor 13, confirms a target subject to be shot, and presses the release switch 12 serving as a shutter, thereby executing recording processing of the image.

Description will be made regarding the internal configuration of an imaging apparatus 100 according to an embodiment of the present invention, with reference to FIG. 2. The imaging apparatus according to an embodiment of the present invention is an imaging apparatus having an auto-focus function. Incident light through a focusing lens 101 and zoom lens 102 is input to an imaging device 103 such as a CCD (Charged Coupled Device) or the like, and is photoelectric-converted at the imaging device 103. The photoelectric-converted data is input to an analog signal processing unit 104, and is subjected to processing such as noise reduction or the like at the analog signal processing unit 104, and is converted into a digital signal at an A/D conversion unit 105. The data digital-converted at the A/D conversion unit 105 is recorded in a recording device 115 made up of, for example, flash memory or the like. Further, this data is displayed on a monitor 117 and viewfinder (EVF) 116. An image through the lens is displayed on the monitor 117 and viewfinder (EVF) 116 as a through image regardless of whether or not shooting is performed.

An operating unit 118 is an operating unit including a release switch 12 and zoom button 15 provided on the camera unit described with reference to FIGS. 1A through 1C, operating buttons 16 for inputting various types of operating information, mode dial 20 for setting a shooting mode, and so forth. A control unit 110 includes a CPU, and executes control of various types of processing executed by the imaging apparatus in accordance with a program stored in memory (ROM) 120 or the like. Memory (EEPROM) 119 is nonvolatile memory, where image data, various types of supplemental information, program, and so forth are stored. The memory (ROM) 120 stores a program, computation parameters, and so forth employed by the control unit (CPU) 110. Memory (RAM) 121 stores the program employed by the control unit (CPU) 110, parameters that change with the execution thereof as appropriate, and so forth. A gyro 111 detects tilt of the imaging apparatus, shaking due to hand motion, and so forth. The detected information is input to the control unit (CPU) 110 and processing such as image shaking prevention is performed. The control unit 110 inputs measurement information for an illuminance meter (not shown), determines whether or not the shooting environment is a low-illuminance environment, and in the event that the shooting environment is a low-illuminance environment controls the AF illuminator emission unit 25 for casting light on the subject, to illuminate the subject.

A motor driver 112 drives a focusing lens driving motor 113 set so as to correspond to the focusing lens 101, and a zoom lens driving motor 114 set so as to correspond to the zoom lens 102. A vertical driver 107 drives the imaging device (CCD) 103. A timing generator 106 generates a processing timing control signal for the imaging device 103 and analog signal processing unit 104, and controls the processing timing of each of these processing units.

A face detection unit 130 analyzes input data input through the lens, and detects faces of people in the image data. Face detection information is sent to the control unit 110, where a distance-measuring frame (also called "detection frame") for auto-focusing (AF) is set for the region of the face that has been detected, based on the detected face information, upon which focus control is performed. With the imaging apparatus according to an embodiment of the present invention, not only is a distance-measuring frame set for the region of the face that has been detected, but also a region is estimated for the body of the person estimated from the face region, a distance-measuring frame is also set for the body region as well, and focus position is determined by executing focus control based on the multiple distance-measuring frames.

Next, description will be made with regard to
(a) Focus Control Processing Based on Contrast Measurement and
(b) Face Region Detection Processing
as processing employed with the imaging apparatus according to an embodiment of the present invention.
(a) Focus Control Processing Based on Contrast Measurement First, description will be made regarding focus control processing based on contrast measurement as an example of auto-focus (AF) control processing executed by the imaging apparatus according to an embodiment of the present invention, with reference to FIG. 3. The focus control based on contrast measurement is a technique for determining a focus position by determining whether the contrast of imaged data obtained through the lens is high or low. This auto-focus (AF) technique is described in Japanese Unexamined Patent Application Publication No. 10-213737, for example.

The focus control is performed by employing the contrast magnitude information of an image obtained at a video camera or still camera. For example, a particular region of an imaged image is set as a signal acquisition region for focus control (spatial-frequency extraction area). This region is referred to as a detection frame (distance-measuring frame). For example, processing is performed wherein multiple small regions of a shot image are set as detection frames. Determination is made that the higher the contrast of a detection frame region is, the more this region is in focus, or the lower the contrast is, the more this region is out of focus, and accordingly, the focus position is adjusted by driving the lens to a position which makes contrast higher.

Figure 3:
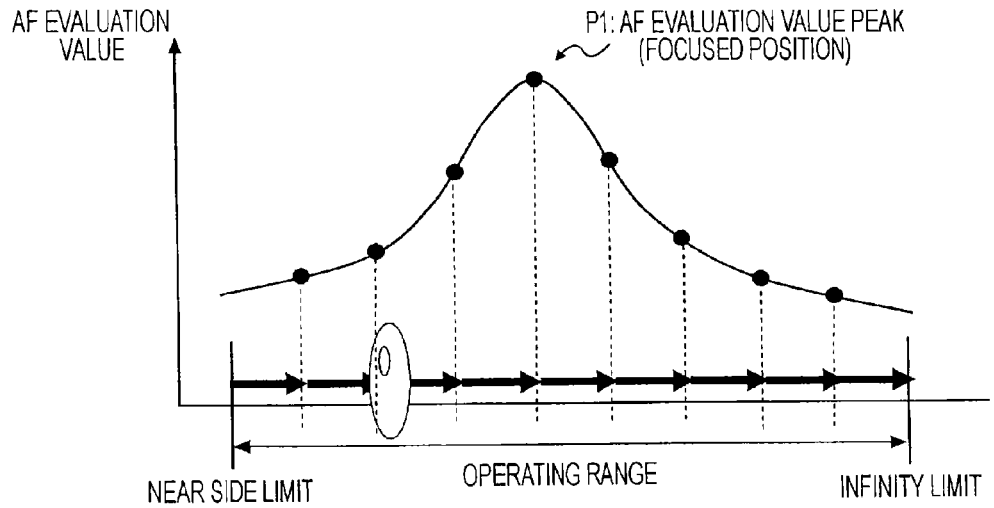
FIG. 3 is a diagram for describing an example of lens driving and AF evaluation value obtaining processing executed as focusing operations in focus control.

Specifically, a method is employed wherein high-frequency components of a detection frame which is a particular region are extracted, integral data of the extracted high-frequency components is generated, and the height of contrast is determined based on the generated high-frequency component integral data. That is to say, multiple images are obtained while moving the focusing lens to multiple positions, and the luminance signal of each image is subjected to filter processing represented by a high-pass filter, thereby obtaining an AF evaluation value indicating the contrast intensity of each image. At this time, in a case wherein there is a subject focused on a certain focus position, an AV evaluation value as to a focusing lens position draws a curve such as shown in FIG. 3. A peak position P1 of this curve, i.e., a position where the contrast value of an image is the maximum is a focus position. According to this method, focusing operation can be performed based on only the information of an image projected on an imager which is an imaging device of a digital camera, and there does not have to be provided a distance-measuring optical system other than an imaging optical system, and accordingly, this method is widely employed with digital cameras.

With the imaging apparatus according to an embodiment of the present invention, a distance-measuring frame is set for the region of the face that has been detected at the face detecting unit 130 shown in FIG. 2, and a separate distance-measuring frame is set for the region of the body of the person estimated from the face region, with the focus position being determined by based on contrast in each of the multiple distance-measuring frames. A configuration employed for this processing will be described in detail later.
(b) Face Region Detection Processing Next, face region detection processing executed at the face detecting unit 130 according to an embodiment of the present invention will be described. Various techniques for recognizing and tracking faces have already been disclosed, and such already-existing techniques can be applied. For example, this can be realized by matching templates in which luminance distribution information of a face has been recorded, against an actual image, such as described in Japanese Unexamined Patent Application Publication No. 2004-133637. First, multiple types of images which have been obtained by reducing actual images, are prepared. Also, face luminance distribution information template group including luminance distribution information of tilted faces is prepared, and these are sequentially matched. The templates are inclined to each of the X, Y, and Z axes of a facial three-dimensional orthogonal coordinates system, and the inclination of an actual face is determined by matching with the templates.

If a certain region matches a template at the time of sequentially matching while shifting the template over a two-dimensional plane as to a reduced image, this means that this region is a position where a face exists. With the imaging apparatus according to an embodiment of the present invention, one distance-measuring frame is set for this face region, and further, a body region is estimated based on this face region and a separate distance-measuring frame is set for the body region as well, with auto-focus being performed based on the contrast determination.

Now, upon the face region having been determined by the above-described template matching, the size of the face can also be obtained from the reduction percentage of the actual image. Also, the rotational angles on the three orthogonal axes, i.e., the yaw, pitch, and roll angles, can be obtained from the template used. Performing auto-focus control having estimated the distance to the face using the size, position, and rotational angle of the face obtained as described above, enables the operational range (Rf) of the focusing lens to be set smaller.

Figure 4:
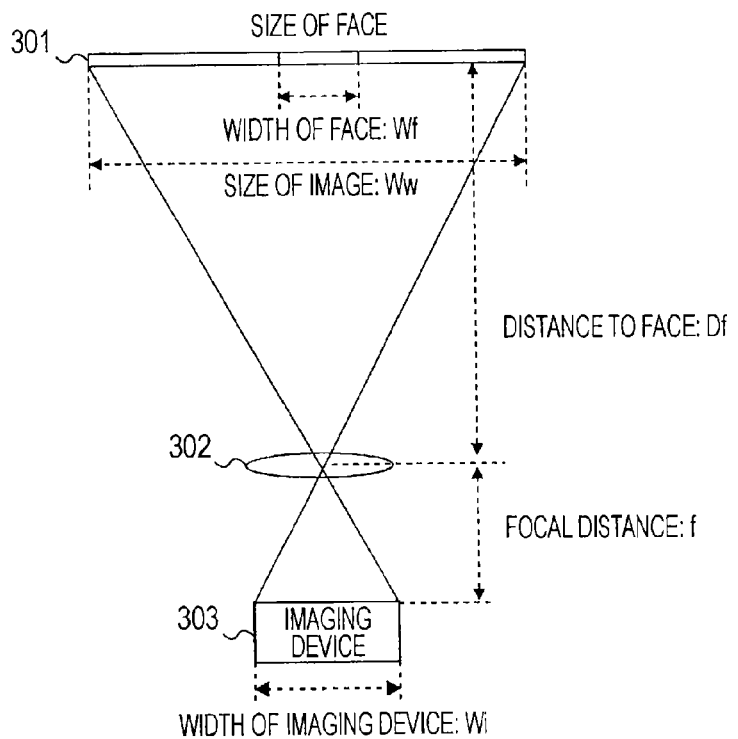
FIG. 4 is a diagram for describing processing for estimating distance to a face in face detection.

A specific calculation method for the distance to the face will be described with reference to FIG. 4. FIG. 4 shows a subject position 301, focusing lens 302, and imaging device 303. A face of a person is at the subject position 301. The size of the face (width of the face) is represented by Wf.

If the actual size of the face (Wf) can be obtained, the subject distance (Df) which is the distance to the face, i.e., the subject distance (Df) which is the distance from the focusing lens 302 to the subject position 301, can be obtained from the expression $$Df = Wref \times (f/Wi) \times (Ww/Wf) \quad \text{(Expression 1)}$$

based on basic physical laws regarding the lens, where Wref represents the reference value for the size of a human face, Wi represents the width of the imaging device, f represents the focal distance, Wf represents the number of pixels for the size of the face of the subject in the imaged image (imaging device detection value), and Ww represents the number of pixels of the image used for detecting the face (imaging device detection value).

A preset fixed value can be used for the reference value for the size of a human face (Wref). Note that this reference value for the size of a human face (Wref) can be set to values taking into consideration personal difference, race, age, gender, and so on, whereby even more accurate distance estimation can be realized.

Next, focus control processing executed with the imaging apparatus according to an embodiment of the present invention will be described in detail with reference to FIG. 5. The imaging apparatus according to an embodiment of the present invention performs different focus controls in accordance with modes set to the imaging apparatus, setting states, and information obtained in various modes. Specifically, focus control is performed changing the starting position and ending position of scanning of the focusing lens, the scanning range, and so on.

The imaging apparatus according to an embodiment of the present invention has a control unit which performs detection of focus position by moving the focusing lens, which is the control unit 110 shown in FIG. 2. The control unit 110 performs auto-focus (AF) scan processing wherein only a part of the moving range of the focus range of the focus range is set as the scan range, as first scanning processing, and in the event that the focus point is not detected in this first scanning processing, performs auto-focus (AF) scan processing wherein a region different from the scanning region of the first scanning processing is set as the scan range, as second scanning processing.

An example wherein four types of focus control processing are executed in accordance with mode and obtained information, will be described by way of the example shown in FIG. 5.

Figure 5:
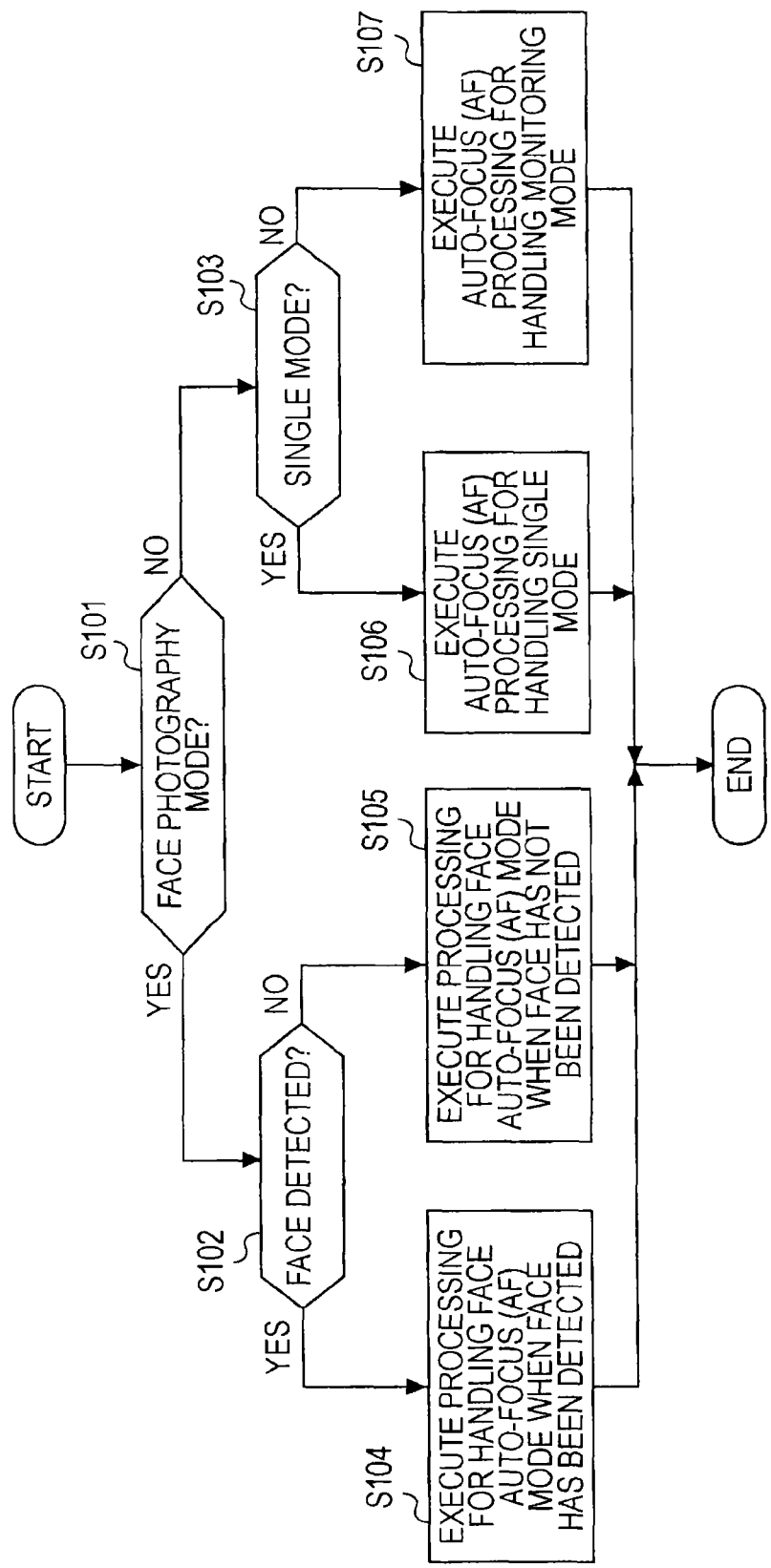
FIG. 5 is a flowchart for describing a processing sequence in focus control according to an embodiment of the present invention.

FIG. 5 is a flowchart showing a processing sequence for deciding the form of focus control to be executed at the imaging apparatus. Note that the flow described with reference to FIG. 5 is executed under control of the control unit 110 of the imaging apparatus 100, and is executed using a program stored in the memory 120, for example.

The processing performed in the steps of the flow shown in FIG. 5 will be described. First, in step S101, determination is made regarding whether or not the imaging apparatus has been set to a face photography mode. Note that the face photography mode is a mode used for detecting a face region of an image acquired by the imaging apparatus and shooting with the face region in focus. This face photography mode is set by user settings.

In the event that the mode is the face photography mode, the flow proceeds to step S102. In step S102, determination is made regarding whether or not a face region has been detected in the imaged image. Note that face detection processing can be realized by matching actual images against templates in which are recorded face luminance distribution information as described above for example, which is executed by the face detecting unit 130 of the imaging apparatus 100 shown in FIG. 2, with the detected information being input to the control unit 110.

In the event that face detection has been successful, the flow proceeds to step S104, and processing is executed for handling a face auto-focus mode for when a face has been detected. Details of this processing will be described later. On the other hand, in the event that face detection has not been successful, the flow proceeds to step S105, and processing is executed for handling the face auto-focus mode for when a face has not been detected. Details of this processing will also be described later.

Also, in the event that determination is made in step S101 that the mode has not been set to the face photography mode, the flow proceeds to step S103, where determination is made regarding whether or not the mode of the imaging apparatus has been set to a single mode. The single mode is a mode wherein focus control is performed without using focus information obtained from monitoring of images acquired by the imaging apparatus. On the other hand, a mode wherein focus control is performed using focus information obtained from monitoring of images acquired by the imaging apparatus is a monitoring mode.

In the event that the mode is the single mode, the flow proceeds to step S106, where auto-focus (AF) processing for the single mode is executed. Details of this processing will be described later. On the other hand, in the event that the mode is the monitoring mode, the flow proceeds to step S107, where auto-focus (AF) processing for the monitoring mode is executed. Details of this processing will also be described later.

That is to say, the following description will be made regarding the details of

Figure 6:
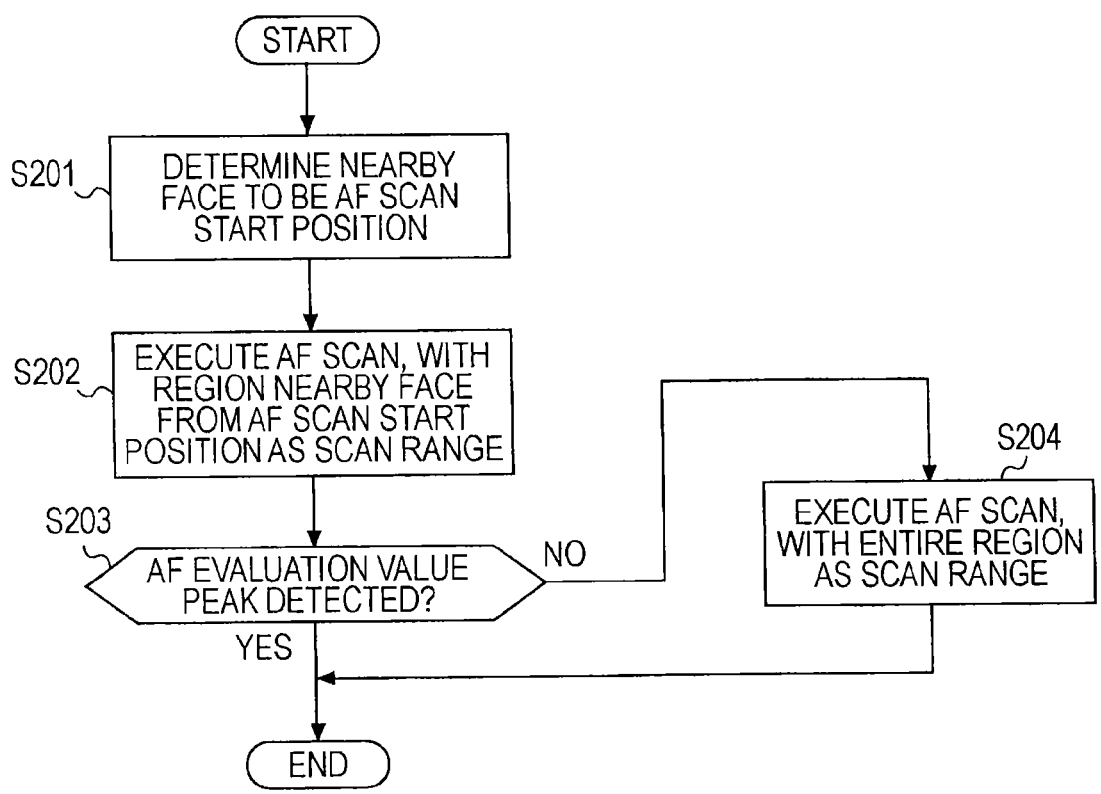
FIG. 6 is a flowchart for describing an auto-focus processing sequence when a face has been detected in the focus control according to an embodiment of the present invention.

Step S104, which is auto-focus control processing in the event that a face has been detected in the face-detection mode, Step S105, which is auto-focus control processing in the event that a face has not been detected in the face-detection mode, Step S106, which is auto-focus control processing in the single mode, and Step S107, which is auto-focus control processing in the monitoring mode, with reference to FIG. 6 and other drawings.

First, details of the auto-focus control processing in step S104 in the event that a face has been detected in the face-detection mode will be described with reference to FIGS. 6 and 7.

The processing in each of the steps of the flowchart shown in FIG. 6 will be described. First, in step S201, nearby a face is determined as the auto-focus (AF) scan start position. In the event that a face has been detected in the face detection mode, the distance information to the face has been obtained, so nearby the face obtained based on this face distance information is determined as the auto-focus (AF) scan start position.

Figure 7:
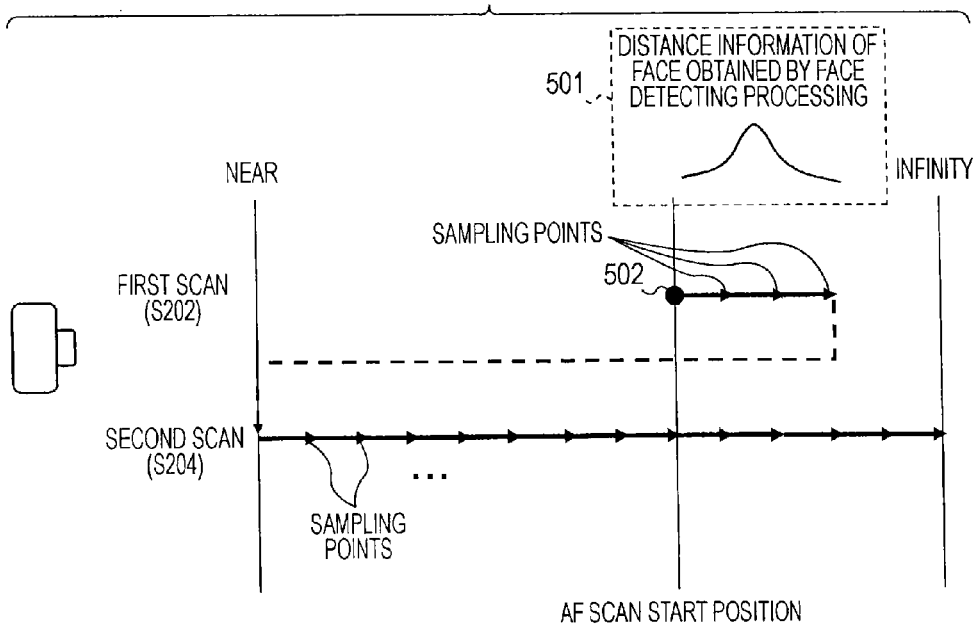
FIG. 7 is a diagram for describing the movement range of a focusing lens and scanning processing in auto-focus processing sequence when a face has been detected.

For example, as shown in FIG. 7, distance information 501 to the face which is obtained by the face detection processing for example, is input, an auto-focus (AF) scan start position 502 is set at the position of the focusing lens where nearby the distance to the face detected by the face detecting processing is the focal distance, and scanning processing is executed wherein only the nearby area is set as the scan range.

In step S202, auto-focus (AF) scanning is executed with the region nearby the face from the auto-focus (AF) scan start position 502 shown in FIG. 7 as the scan range. This is processing corresponding to the first scan shown in FIG. 7. Note that the starting points and ending points of the heavy arrows are the sampling points for obtaining AF evaluation values based on the contrast. Processing for obtaining the AF evaluation values based on contrast is performed in the same way as the processing described earlier with reference to FIG. 3.

In step S203, determination is made regarding whether or not an AF evaluation value peak has been detected in the auto-focus (AF) scan nearby the face in step S202. In the event that an AF evaluation value peak has been detected, that peak point is determined as the focus point (focal position).

On the other hand, in the event that no AF evaluation value peak has been detected in the auto-focus (AF) scan nearby the face in step S202, the flow proceeds to step S204. In step S204, all regions are subjected to AF scanning as the scan range. That is to say, as indicated by the second scan shown in FIG. 7, the entire region of the moving range of the focusing lens, i.e., from the near end to infinity, is subjected to AF scanning as the scan range. The peak position of the AF evaluation value in the second scan is determined as the focus point (focal position).

Thus, with auto-focus control in the event that a face has been detected in the face detection mode, first, AF scanning is executed in a scan range which is set restricted to the auto-focus (AF) scan start position 502 nearby the distance information of the face obtained by the face detection processing, so in the event that the face still remains in the image, the focus point (focal position) can be found in a short time.

Also, in the event that no AF evaluation value peak has been detected in this first restricted scan range, the entire range is automatically subjected to AF scanning, so focus points (focal points) of subjects in various distances can be found, such as with a case where the face has moved, for example.

Figure 8:
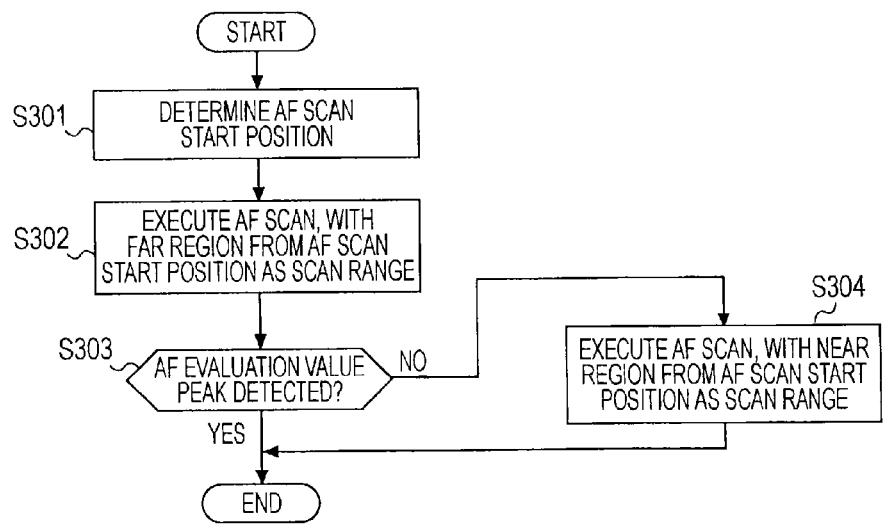
FIG. 8 is a flowchart for describing an auto-focus processing sequence when a face has not been detected in the focus control according to an embodiment of the present invention.

Next, details of the auto-focus control processing in step S105 in the flowchart in FIG. 5 in the event that a face has not been detected in the face-detection mode will be described with reference to FIGS. 8 and 9.

The processing in each of the steps of the flowchart shown in FIG. 8 will be described. First, in step S301, an auto-focus (AF) scan starting position is decided. This auto-focus (AF) scan starting position is the estimated distance to the subject to be photographed (subject distance). The subject distance is obtained by the following expression.

Subject distance (*m*) (focal distance)×(height of subject)/(height of imager)/1000 (Expression 2)

In the above expression, the (height of subject) changes depending on the composition of the shot. For example, for a face close-up, the height of the subject should be set to around 20 to 25 cm, and in the case of a bust shot (from the chest up to the head), the height of the subject should be set to around 60 cm. The subject height data depends on the subject, and accordingly user input data may be used, or a configuration may be made wherein the subject height is calculated by analyzing images acquired at the imaging apparatus and re-calculated at predetermined intervals. Another arrangement is to store the subject height in memory of the imaging apparatus beforehand as ROM data, to be available for use.

In step S301, the position of the focusing lens of which nearby the subject distance calculated by the above expression is the focal distance, is set as the auto-focus (AF) scan start position. For example, as shown in FIG. 9, an auto-focus (AF) scan start position 521 is set.

Figure 9:
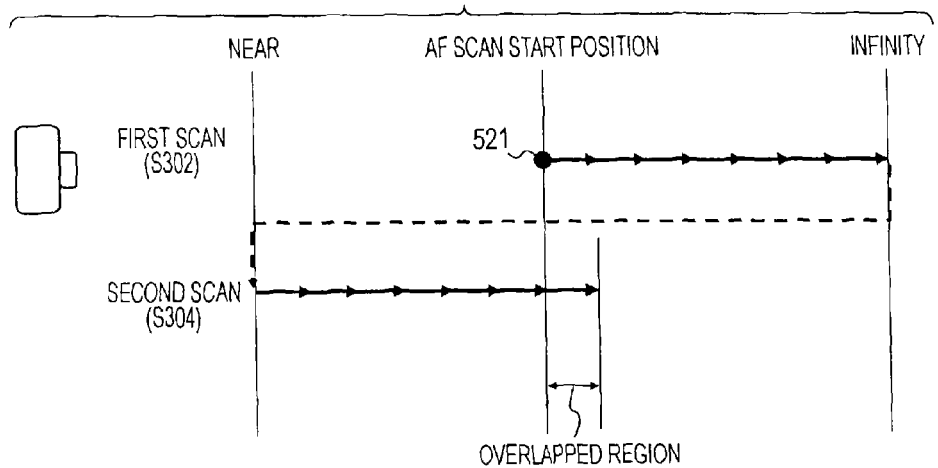
FIG. 9 is a diagram for describing the movement range of a focusing lens and scanning processing in auto-focus processing sequence when a face has not been detected.

In step S302, auto-focus (AF) scanning is performed over a scan range of the auto-focus (AF) scan start position 521 shown in FIG. 9 to the far region. That is to say, the focusing lens is moved only in one direction from the scan start position to execute the first scan processing.

This is processing corresponding to the first scan shown in FIG. 9. Note that the starting points and ending points of the heavy arrows are the sampling points for obtaining AF evaluation values based on the contrast. Note that processing for obtaining the AF evaluation values based on contrast is performed in the same way as the processing described earlier with reference to FIG. 3.

In step S303, determination is made regarding whether or not an AF evaluation value peak has been detected in the first auto-focus (AF) scan performed in step S302. In the event that an AF evaluation value peak has been detected, that peak position is determined to be the focus point (focal position).

On the other hand, in the event that an AF evaluation value peak has not been detected in the first auto-focus (AF) scan performed in step S302, the flow proceeds to step S304. In step S304, AF scan is executed with the nearer region from the auto-focus (AF) scan start position 521 as the scan range. That is to say, as shown with the second scan in FIG. 9, the region of the near end to the auto-focus (AF) scan start position is subjected to AF scan. The AF evaluation value peak of this second scan is determined to be the focus point (focal position).

Note that the scan ending point in the second auto-focus (AF) scan processing is preferably a point where the second scan goes past the auto-focus (AF) scan start position 521 so that the first scan region and the second scan region overlap.

Thus, with auto-focus control in the event that a face has not been detected in the face-detection mode, the subject distance, which is an estimated distance of the subject to be photographed, is obtained by the expression Subject distance (*m*)=(focal distance)×(height of subject)/(height of imager)/1000 and an AF scan is executed in a scan range restricted to the position of the focusing lens of which nearby the subject distance is the focal distance being the auto-focus (AF) scan start position, so the focus point (focal position) can be found in a short time. Also, in the event that no AF evaluation value peak has been detected in this first restricted scan range, the remaining range is automatically subjected to AF scanning, so focus points (focal points) of subjects in various distances can be found.

Figure 10:
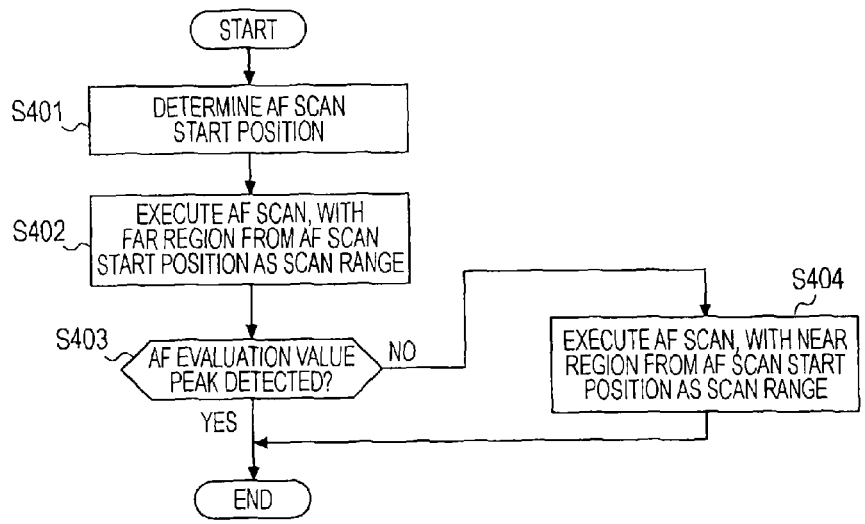
FIG. 10 is a flowchart for describing an auto-focus processing sequence when in a single mode in the focus control according to an embodiment of the present invention.

Next, details of the auto-focus control processing in step S106 in the flowchart in FIG. 5 in the single mode will be described with reference to FIGS. 10 and 11.

The processing in each of the steps of the flowchart shown in FIG. 10 will be described. First, in step S401, an auto-focus (AF) scan starting position is decided. This auto-focus (AF) scan starting position is the estimated distance to the subject to be photographed (subject distance), in the same way as with the case described above wherein a face is not detected in the face detection mode. The subject distance is obtained by the following expression.

Subject distance (*m*)=(focal distance)×(height of subject)/(height of imager)/1000

In step S401, the position of the focusing lens of which nearby the subject distance calculated by the above expression is the focal distance, is set as the auto-focus (AF) scan start position. For example, as shown in FIG. 11, an auto-focus (AF) scan start position 541 is set.

Figure 11:
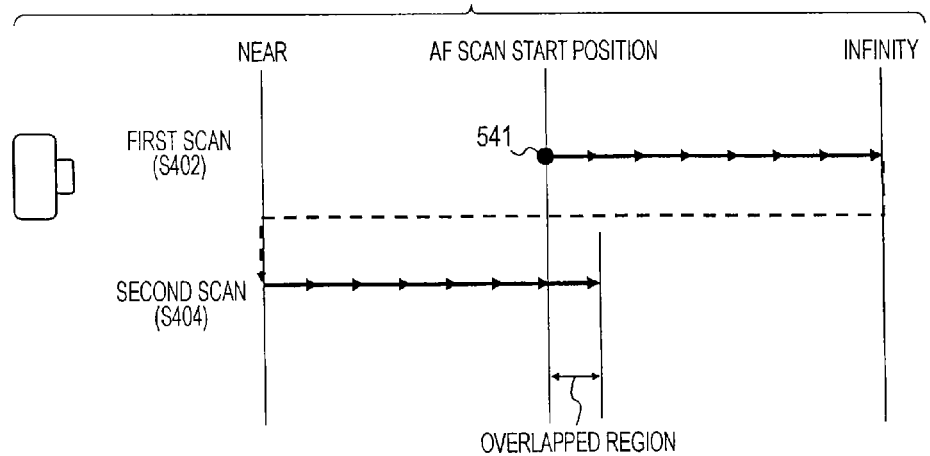
FIG. 11 is a diagram for describing the movement range of a focusing lens and scanning processing in auto-focus processing sequence when in the single mode.

In step S402, auto-focus (AF) scanning is performed over a scan range of the auto-focus (AF) scan start position 541 shown in FIG. 11 to the far region. That is to say, the focusing lens is moved only in one direction from the scan start position to execute the first scan processing. This is processing corresponding to the first scan shown in FIG. 9. Note that the starting points and ending points of the heavy arrows are the sampling points for obtaining AF evaluation values based on the contrast. Note that processing for obtaining the AF evaluation values based on contrast is performed in the same way as the processing described earlier with reference to FIG. 3.

In step S403, determination is made regarding whether or not an AF evaluation value peak has been detected in the first auto-focus (AF) scan performed in step S402. In the event that an AF evaluation value peak has been detected, that peak position is determined to be the focus point (focal position).

On the other hand, in the event that an AF evaluation value peak has not been detected in the first auto-focus (AF) scan performed in step S402, the flow proceeds to step S404. In step S404, AF scan is executed with the nearer region from the auto-focus (AF) scan start position 541 set in step S401 as the scan range. That is to say, as shown with the second scan in FIG. 11, the region of the near end to the auto-focus (AF) scan start position is subjected to AF scan. The AF evaluation value peak of this second scan is determined to be the focus point (focal position).

Note that the scan ending point in the second auto-focus (AF) scan processing is preferably a point where the second scan goes past the auto-focus (AF) scan start position 541 so that the first scan region and the second scan region overlap.

Thus, with auto-focus control in the single mode, first, the subject distance, which is the estimated distance of the subject to be photographed, is obtained by the expression $$\text{Subject distance }(m) = (\text{focal distance}) \times (\text{height of subject})/(\text{height of imager})/1000$$

and an AF scan is executed in a scan range restricted to the position of which nearby the subject distance is set as the auto-focus (AF) scan start position, so the focus point (focal position) can be found in a short time. Also, in the event that no AF evaluation value peak has been detected in this first restricted scan range, the remaining range is automatically subjected to AF scanning, so focus points (focal points) of subjects in various distances can be found.

Figure 12:
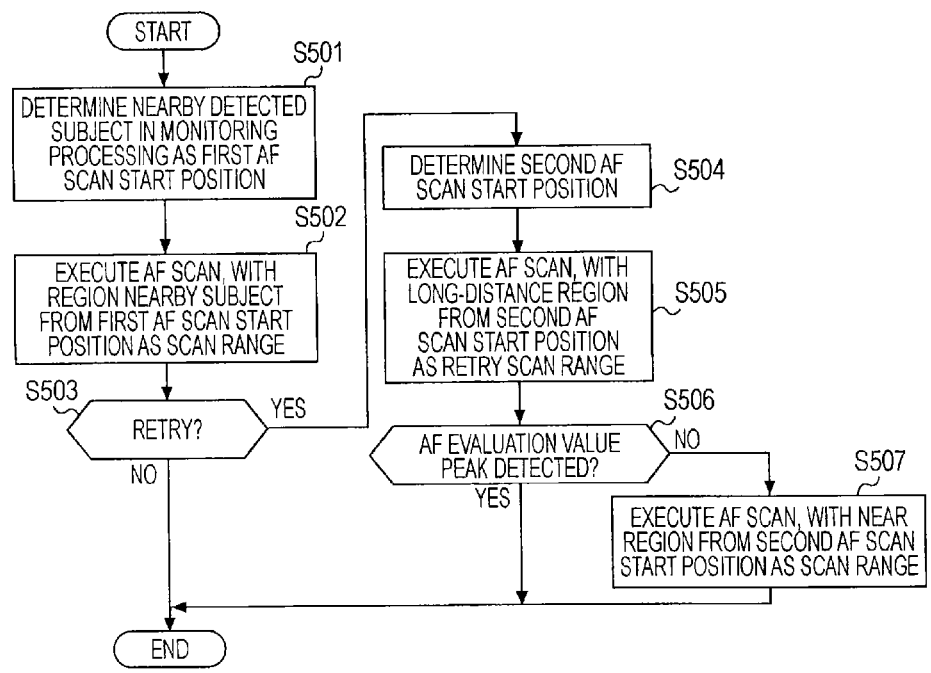
FIG. 12 is a flowchart for describing an auto-focus processing sequence when in a monitoring mode in the focus control according to an embodiment of the present invention.

Next, details of the auto-focus control processing in step S107 in the flowchart in FIG. 5 in the monitoring mode will be described with reference to FIGS. 12 and 13.

The processing in each of the steps of the flowchart shown in FIG. 12 will be described. First, in step S501, nearby the subject detected in monitoring processing is determined as the first auto-focus (AF) scan start position. In the monitoring processing, distance information to the subject is periodically obtained based on images acquired by the imaging apparatus, and the first auto-focus (AF) scan start position is set nearby the subject obtained based on this obtained information.

Figure 13:
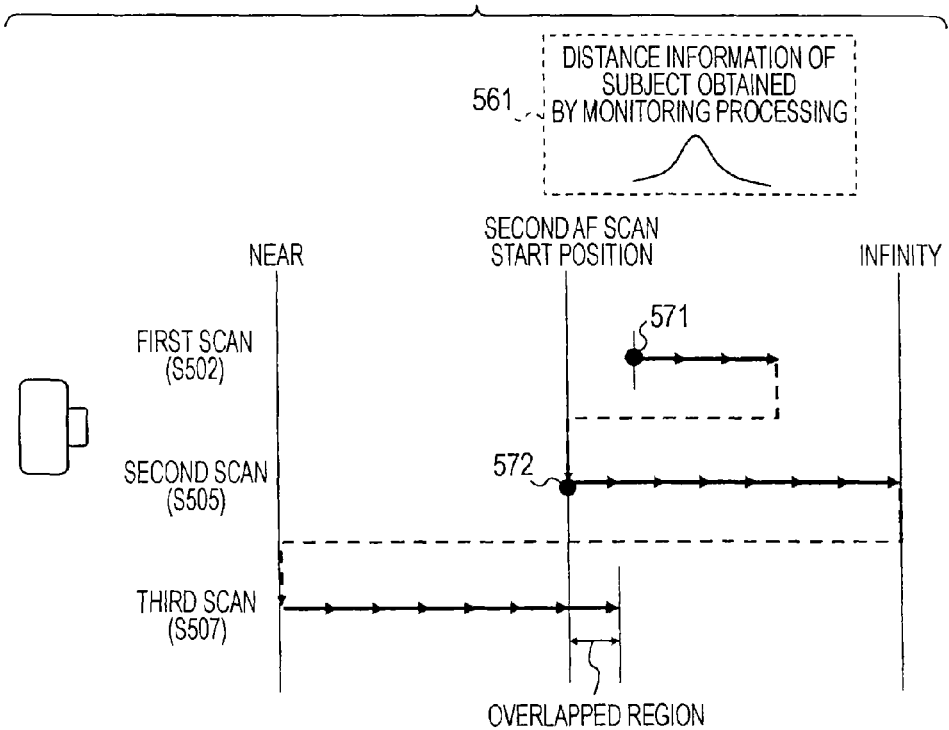
FIG. 13 is a diagram for describing the movement range of a focusing lens and scanning processing in auto-focus processing sequence when in the monitoring mode.

For example, as shown in FIG. 13, distance information 561 of the subject obtained by monitoring processing is input, and the position of the focusing lens of which nearby the subject distance information is the focal distance, is set as the auto-focus (AF) scan start position 571.

In step S502, auto-focus (AF) scanning is performed over a scan range of the auto-focus (AF) scan start position 571 shown in FIG. 13 over a region nearby the subject. This is processing corresponding to the first scan shown in FIG. 13. Note that the starting points and ending points of the heavy arrows are the sampling points for obtaining AF evaluation values based on the contrast. Note that processing for obtaining the AF evaluation values based on contrast is performed in the same way as the processing described earlier with reference to FIG. 3.

In step S503, determination is made regarding whether or not to execute retry processing of the auto-focus (AF) scan. Retry processing is processing wherein the scan region is enlarged or changed in the event that the focal position was not found in the first scanned region, and in accordance with user settings, the flow automatically proceeds to step S504 in the event that an AF evaluation value peak is not detected, for example. In the event that an AF evaluation value peak is detected in the auto-focus (AF) scan of the restricted region in step S502, this peak position is determined to be the focus point (focal position).

In the case of executing retry processing, such as in the event that an AF evaluation value peak was not detected or the like, the flow proceeds to step S504. In step S504, a second auto-focus (AF) scan starting position is decided.

This second auto-focus (AF) scan starting position is the estimated distance to the subject to be photographed (subject distance), in the same way as with the other modes described above. The subject distance is obtained by the following expression.

$$\text{Subject distance }(m) = (\text{focal distance}) \times (\text{height of subject})/(\text{height of imager})/1000$$

In step S504, the position of the focusing lens of which nearby the subject distance calculated by the above expression is the focal distance, is set as the second auto-focus (AF) scan start position. For example, as shown in FIG. 13, a second auto-focus (AF) scan start position 572 is set.

In step S505, auto-focus (AF) scanning is performed over a scan range of the auto-focus (AF) scan start position 572 shown in FIG. 11 to the far region. This is processing corresponding to the second scan shown in FIG. 13. Note that the starting points and ending points of the heavy arrows are the sampling points for obtaining AF evaluation values based on the contrast. Note that processing for obtaining the AF evaluation values based on contrast is performed in the same way as the processing described earlier with reference to FIG. 3.

In step S506, determination is made regarding whether or not an AF evaluation value peak has been detected in the second auto-focus (AF) scan performed in step S502. In the event that an AF evaluation value peak has been detected, that peak position is determined to be the focus point (focal position).

On the other hand, in the event that an AF evaluation value peak has not been detected in the second auto-focus (AF) scan performed in step S502, the flow proceeds to step S507. In step S507, AF scan is executed with the nearer region from the second auto-focus (AF) scan start position 572 set in step S504 as the scan range. That is to say, as shown with the third scan in FIG. 13, the region of the near end to the auto-focus (AF) scan start position is subjected to AF scan. The AF evaluation value peak of this third scan is determined to be the focus point (focal position).

Note that the scan ending point in the third auto-focus (AF) scan processing is preferably a point where the third scan goes past the second auto-focus (AF) scan start position 572 so that the second scan region and the third scan region overlap.

Thus, with auto-focus control in the monitoring mode, first, the auto-focus (AF) scan start position 571 is set nearby the subject distance information obtained by monitoring processing, and an AF scan is executed in this restricted scan range, so the focus point (focal position) can be found in a short time.

Also, in the event that no AF evaluation value peak has been detected in this first restricted scan range, second and third AF scans are automatically performed, so focus points (focal points) of subjects in various distances can be found, such as in a case of a subject which had been monitored moving.

Thus, with the imaging apparatus according to an embodiment of the present invention, different driving ranges of the focusing lens are set for obtaining AF evaluation values in accordance with the zoom position, thereby enabling effective prevention of confusing AF evaluation value peaks being detected together, so the subject which the user intends can be focused on quickly and accurately. Also, restricting the scan range not only realizes fast focusing settings but also enables power consumption in driving the focusing lens to be reduced.

Further, an arrangement may be made wherein scene identification functions, such as whether a scene is scenery, a nightscape, or the like, for example, are provided, such that the scan start point is decided according to the identified scene. For example, in the event that judgment is made that the scene is a scenery shot, the scan start point is set at the far side (e.g., 6 to 10 m). Also, in the case that a face has been detected, a distance such that the entire region of the face can be taken is set for the scan start point, such as 40 to 50 cm, for example. Related art can be used for scene identification functions.

Further, response at the time of shooting can be made faster by user settings. For example, an arrangement may be made wherein, when starting up for the first time following purchasing the imaging apparatus, the user inputs preferred photography information such as "lots of outdoor shooting", "lots of indoor shooting", "mostly snapshots", and so forth, and beforehand scan starting points set according to such photography information are compiled into a table and stored in memory, so that scan starting points corresponding to information obtained from the table in accordance with the setting information of the user are set.

Icon Display Control Configuration for Macro Mode and Magnifying Glass Mode

Next, an embodiment for performing icon display control of a macro mode and magnifying glass mode will be described. A camera described in the present embodiment is a camera having a macro mode which is suitable for near region (macro region) photography of which the distance to the subject is close, in the order of tens of centimeters for example, and further a magnifying glass mode which is suitable for very near region (magnifying glass region) photography of which the distance to the subject is even closer, in the order of several centimeters, for example.

As described earlier, with many cameras according to the related art which have such modes, determination is made whether the subject distance is the far region, the macro region in which the distance to the subject is close, in the order of tens of centimeters, and further a magnifying glass region in which the distance to the subject is even closer, in the order of several centimeters, using the subject distance information obtained at the time of monitoring processing of subject images, and an icon (e.g., a tulip icon) is displayed at a monitoring image display unit of the camera in accordance with this determination information.

However, executing icon display processing based on subject distance information measured at the time of monitoring processing of the subject can cause the following problems. That is to say, in the event that the user changes the angle by panning, tilting, zooming, or the like, to take an actual photo, the monitoring auto-focus (AF) takes time which results in difference between the actual subject distance and timing of the icon being displayed or going off, so the icon may be unsuitably displayed, or a situation may occur where the focus position is in the macro region or magnifying glass region but no icon is displayed.

The examples described next are cases of performing suitable control such that erroneous photography does not occur, by applying information other than subject distance information obtained by monitoring AF, such as information of the camera due to user operations or the like, for example.

Let us consider a case wherein icons are displayed in accordance with three types of subject distances, i.e., (a) far region,
(b) near region (macro region), and
(c) magnifying glass region, meaning that determination has to be determined to distinguish between the far region, near region (macro region), and magnifying glass region. This further means that boundaries have to be set between the far region, near region (macro region), and magnifying glass region.

As described earlier, the subject distance can be calculated by the following expression.

$$\text{Subject distance } (m) \text{ (focal distance)} \times \text{(height of subject)}/\text{(height of imager)}/1000$$

In the above expression, the (height of subject) changes depending on the composition of the shot. For example, for a face close-up, the height of the subject should be set to around 20 to 25 cm, and in the case of a bust shot (from the chest up to the head), the height of the subject should be set to around 60 cm. The subject height data depends on the subject, and accordingly user input data may be used, or a configuration may be made wherein the subject height is calculated by analyzing images acquired at the imaging apparatus and re-calculated at predetermined intervals. Another arrangement is to store the subject height in memory of the imaging apparatus beforehand as ROM data, to be available for use.

Also, the camera has a zoom lens which moves in accordance with zoom control, and a focusing lens which moves in accordance with focus control. There is a correlation between the position of the focusing lens when in focus as to the position of the zoom lens. A curve which shows this correlation is called a cam curve. The boundaries between the far region, near region (macro region), and magnifying glass region, can be defined applying cam curves.

Figure 14:
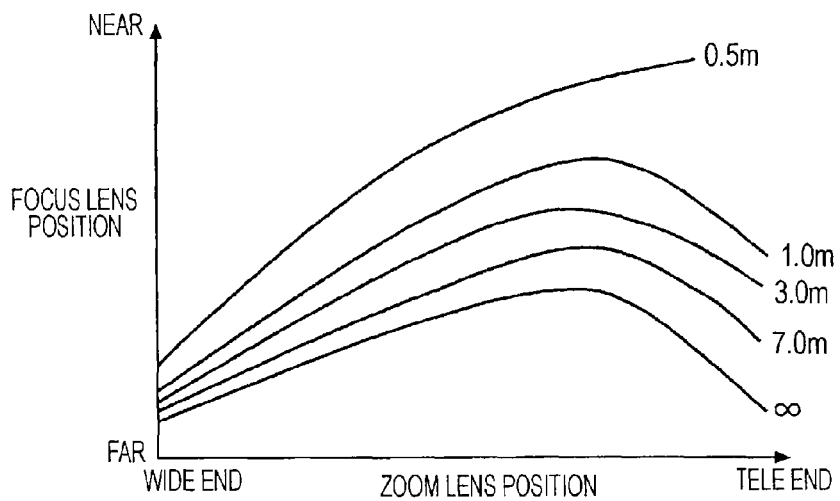
FIG. 14 is a diagram for describing cam curves.

FIG. 14 is a diagram illustrating the track of a focusing lens position serving as a focal point wherein focusing is realized for each of multiple different subject distances (0.5 m, 1.0 m, 3.0 m, 7.0 m, and ∞) with the horizontal axis as a zoom lens position (wide end through tele end), and with the vertical axis as a focusing lens position (infinity side through near side). The curves drawn in this graph are referred to as cam curves.

For example, in a case wherein the user employs the focus preset function to set the distance to a subject, and operates the zoom lens, the user moves the focusing lens along this curve (cam curve), whereby the focusing lens can be set to a focus position.

These cam curves can be applied to define boundaries between the far region, near region (macro region), and magnifying glass region.

For example, if we define a subject distance of 1 cm to 20 cm as the magnifying glass region, the boundary between the near region (macro region) and the magnifying glass region can be simply set to a cam curve where the subject distance equals 20 cm. Also, the boundary between the far region and the near region (macro region) can be set to a cam curve where the subject distance equals 1 m. This boundary information data is stored in memory as ROM data.

If we want to switch display of icons in accordance with the three types of subject distances, i.e., (a) far region,
(b) near region (macro region), and
(c) magnifying glass region, icon switching processing can be performed such that
(a) no icon is displayed when the subject distance is in the far region,
(b) a macro region icon is displayed when the subject distance is in the near region (macro region), and
(c) a magnifying glass region icon is displayed when the subject distance is in the magnifying glass region.

Figure 15:
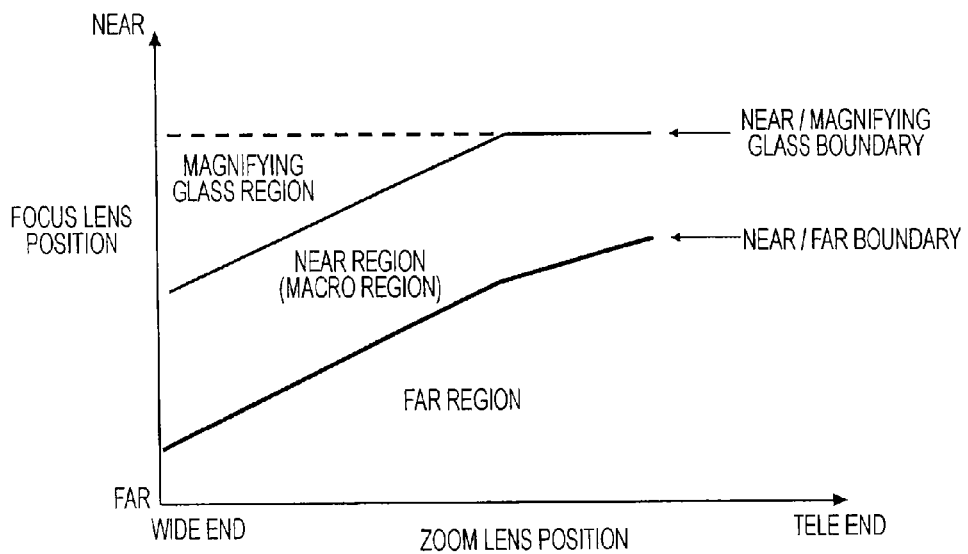
FIG. 15 is a diagram for describing an example of processing for setting boundaries between a near region, far region, and magnifying glass region.

For example, settings can be made to determine at which of the regions shown in FIG. 15 the position of the focusing lens corresponds to when performing monitoring auto-focus (AF) or auto-focus (AF) scanning processing. In the event that the focusing lens position is in the near region (macro region) shown in FIG. 15, the macro region icon is displayed, and the event that the focusing lens position is in the magnifying glass region in FIG. 15, the magnifying glass region icon is displayed.

However, if display switchover for display/non-display of the icons for subject distance is rigidly executed while performing monitoring auto-focus (AF) processing, so-called chattering (hunting) may occur in which the displays rapidly change back and forth, leaving the user with an unpleasant experience. To avoid this, an LPF (low-pass filter) is preferably applied to provide the crossover portion of switchover for display/non-display of the icons, such that the display is not switched the instant that the boundary is traversed, but rather the display is changed after a certain amount of standby time.

Figure 16:
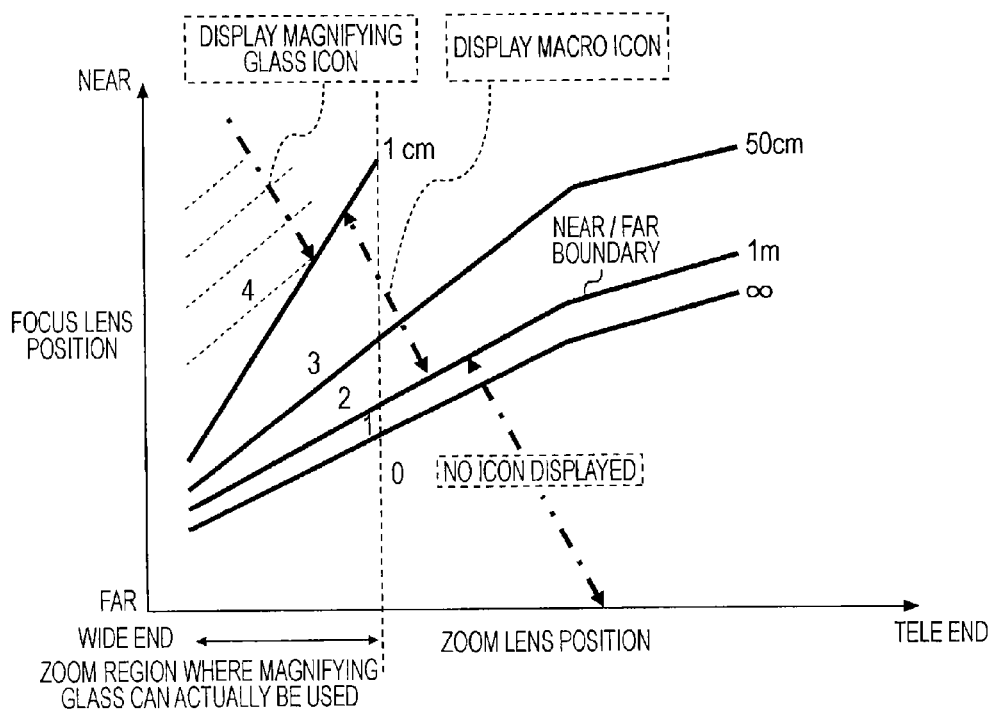
FIG. 16 is a diagram for describing an example of icon display control for the near region, far region, and magnifying glass region.

Particularly, at the region near the wide end for the zoom lens, the cam curves (distance interval) are in close proximity, the displays rapidly change back and forth if display switchover is rigidly executed at the boundary. A configuration to prevent this is shown in FIG. 16 for example, where numbered areas are provided with intervals of depths of k from the boundary line between the far region/near region, in order toward the near side. This k is the open depth at the current zoom position when k=1, for example. Control is effected such that the macro icon corresponding to the near region is displayed when the area is 2 or 3, and the magnifying glass icon is displayed when 4.

Description of Scanning AF

Auto-focus (AF) scanning processing starts by the user half-pressing the shutter button. The focusing lens is driven to the focus position where the high-frequency component of the set AF area is the maximum value, and full-pressing the shutter button in this state records the image.

An example of an auto-focus (AF) scanning processing sequence in a case of auto-macro settings wherein the boundaries between the far region, near region (macro region), and magnifying glass region have been defined will be described with reference to FIG. 17.

Figure 17:
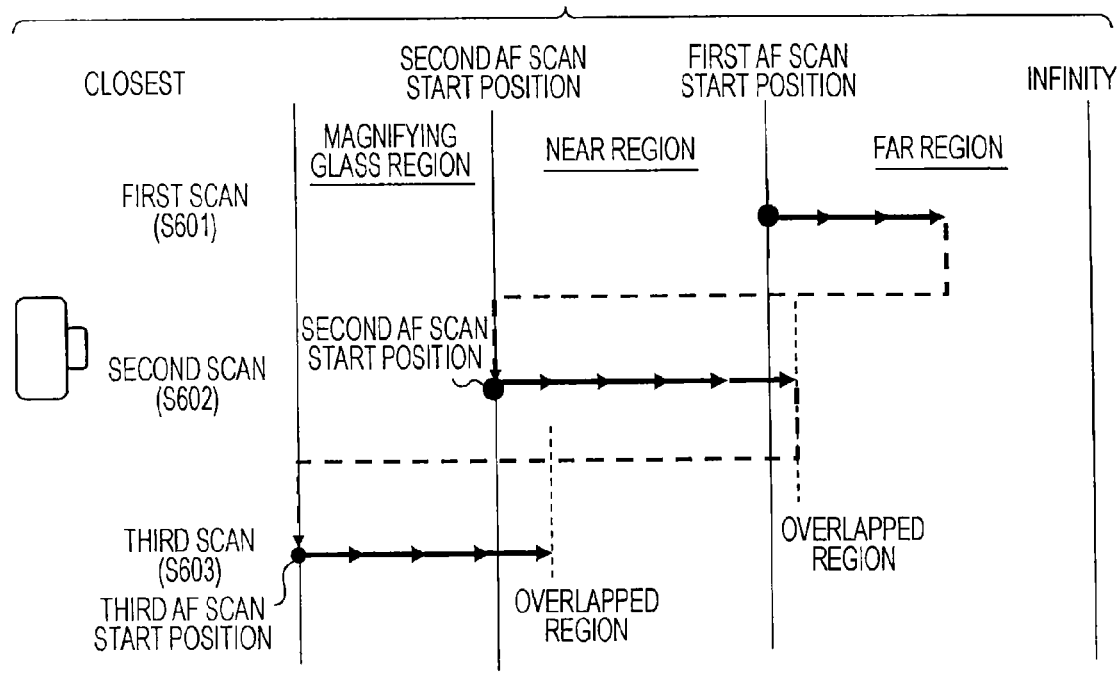
FIG. 17 is a diagram for describing a processing example of auto-focus (AF) scanning in the near region, far region, and magnifying glass region.

As shown in FIG. 17, with the auto-focus (AF) scanning processing, first, auto-focus (AF) scanning is performed in the far direction with boundary between the far region and the near region (macro region) as the first auto-focus (AF) scan start position. This is processing corresponding to the first scan in step S601 shown in FIG. 17. Note that the starting points and ending points of the heavy arrows are the sampling points for obtaining AF evaluation values based on the contrast. Note that processing for obtaining the AF evaluation values based on contrast is performed in the same way as the processing described earlier with reference to FIG. 3.

In the event that an AF evaluation value peak has been detected in the processing in step S601, that peak position is determined to be the focus point (focal position). In the event that an AF evaluation value peak has not been detected, the flow proceeds to step S602.

In step S602, auto-focus (AF) scanning is performed in the far direction with boundary between the near region (macro region) and the magnifying glass region as the second auto-focus (AF) scan start position. This is processing corresponding to the second scan in step S602 shown in FIG. 17. In the event that an AF evaluation value peak has been detected in the processing in step S602, that peak position is determined to be the focus point (focal position). In the event that an AF evaluation value peak has not been detected, the flow proceeds to step S603.

In step S603, auto-focus (AF) scanning is performed in the far direction with closest position as the third auto-focus (AF) scan start position. This is processing corresponding to the third scan in step S603 shown in FIG. 17. In the event that an AF evaluation value peak has been detected in the processing in step S603, that peak position is determined to be the focus point (focal position).

Note that the start trigger of the auto-focus (AF) scan is the half-pressing of the shutter button. Other triggers may be used to start auto-focus (AF) scanning processing however, such as performing face detection of a subject, and starting in the event that the size generally matches preset sampling information for example, such that change in face size serves as the trigger. Another example is to use completion of a zooming operation as a start point for the auto-focus (AF) scanning processing.

Figure 18:
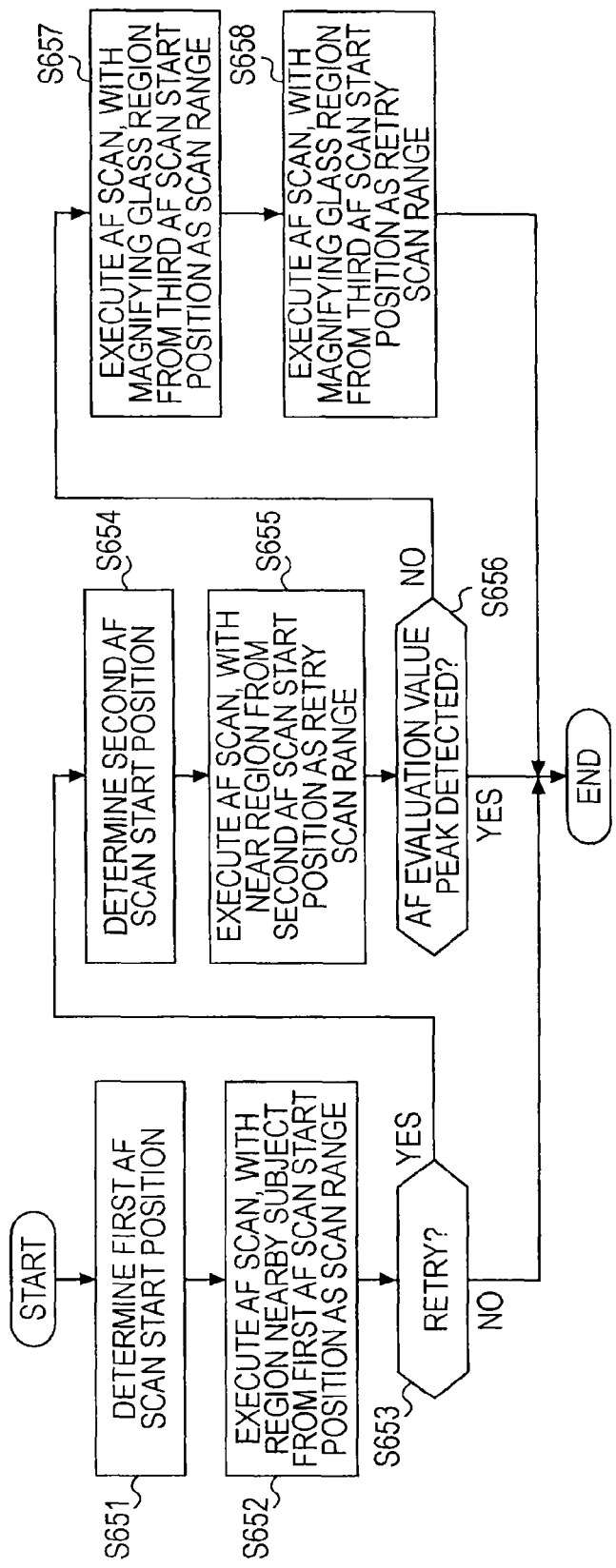
FIG. 18 is a flowchart for describing a processing example of auto-focus (AF) scanning in the near region, far region, and magnifying glass region.

A detailed sequence of the auto-focus (AF) scanning processing shown in FIG. 17 will be described with reference to the flowchart shown in FIG. 18. First, in step S651, the boundary between the far region and the near region (macro region) is determined as the first auto-focus (AF) scan start position. In step S652, auto-focus (AF) scanning is performed in the far direction from the first auto-focus (AF) scan start position. This is processing corresponding to the first scan shown in FIG. 17. Note that the starting points and ending points of the heavy arrows are the sampling points for obtaining AF evaluation values based on the contrast.

In step S653, determination is made regarding whether or not to execute a retry for the auto-focus (AF) scan. Retry processing is processing wherein the scan region is enlarged or changed in the event that the focal position was not found in the first scanned region, and in accordance with user settings, the flow automatically proceeds to step S654 in the event that an AF evaluation value peak is not detected, for example. In the event that an AF evaluation value peak is detected in the auto-focus (AF) scan of the restricted region in step S652, this value peak is determined to be the focus point (focal position).

In the event that a retry is to be executed, such as a case in which no AF evaluation value peak was detected in step S653, the flow proceeds to step S654. In step S654, the second auto-focus (AF) scan start position is determined.

The boundary between the near region (macro region) and the magnifying glass region is the second auto-focus (AF) scan start position. In step S655, auto-focus (AF) scanning is performed in the far direction from the second auto-focus (AF) scan start position. This is processing corresponding to the second scan in step S602 shown in FIG. 17. In the event that an AF evaluation value peak has been detected in the processing in step S602, that peak position is determined to be the focus point (focal position). In the event that an AF evaluation value peak has not been detected, the flow proceeds to step S657.

In step S657, the closest position as the third auto-focus (AF) scan start position, and auto-focus (AF) scanning is performed in the far direction. This is processing corresponding to the third scan in step S603 shown in FIG. 17. In the event that an AF evaluation value peak has been detected in the processing in step S602, that peak position is determined to be the focus point (focal position).

Icon Display Control

Figure 19:
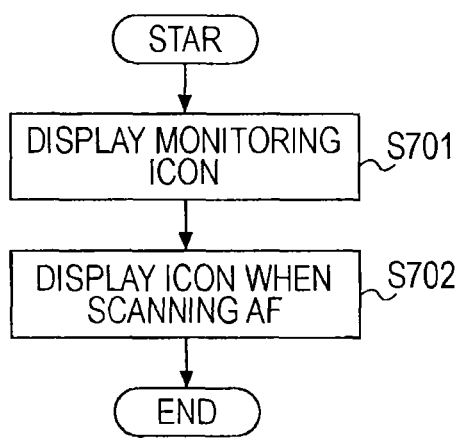
FIG. 19 is a flowchart for describing an icon display control processing sequence in auto-focus (AF) processing.

Next, the icon display control sequence according to the present embodiment will be described with reference to the flowcharts in FIG. 19 and subsequent drawings. As shown in the flowchart in FIG. 19, the icon display control processing can be divided into icon display control in a case of monitoring auto-focus (AF) processing which is step S701, and icon display control processing in a case of auto-focus (AF) scanning processing, which is step S702.

Figure 20:
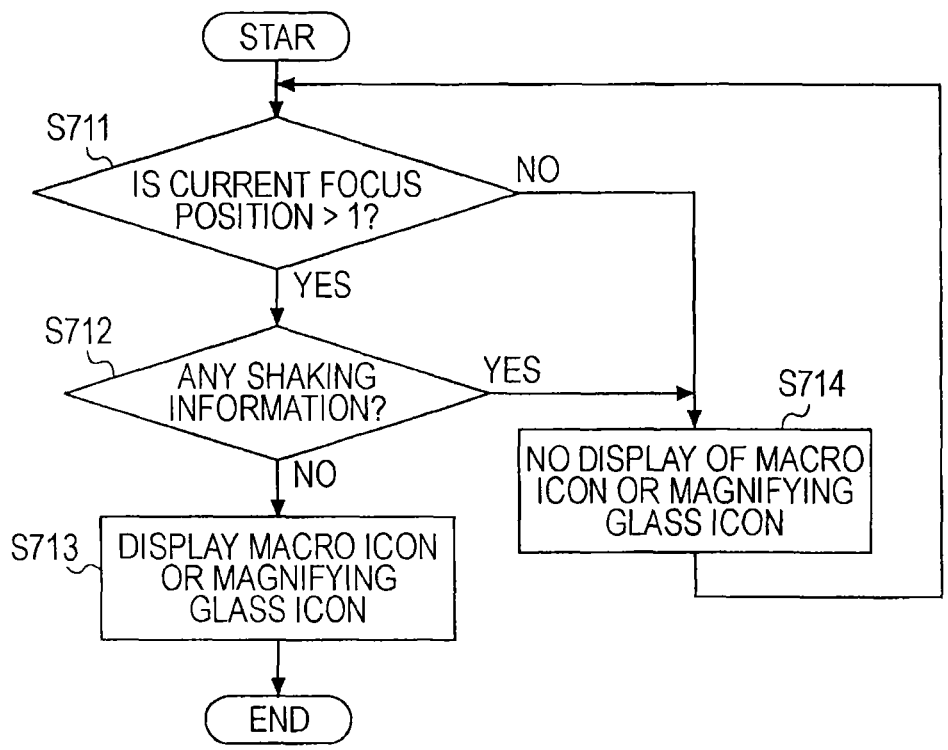
FIG. 20 is a flowchart for describing an icon display control processing sequence in auto-focus (AF) processing.

First, the sequence of icon display control in a case of monitoring auto-focus (AF) processing, which is step S701, will be described with reference to the flowchart shown in FIG. 20.

In step S711, the current focus position is verified, and determination is made regarding whether or not the position of the focusing lens is in one of the regions 2 through 4 sectioned by the cam curves shown in FIG. 16. In the event that the focusing lens position is in the region "1", which is other than 2 through 4, determination is made that the subject is in the far region, so the flow proceeds to step S714 and neither the macro icon nor the magnifying glass icon is displayed.

In step S711, in the event that determination is made that the focusing lens position is in the regions 2 through 4 sectioned by the cam curves shown in FIG. 16, the flow proceeds to step S712, and detection is performed for shaking, using detection information from the gyro sensor. In the event that there is shaking, the flow proceeds to step S714, and neither the macro icon nor the magnifying glass icon is displayed. This is processing assuming that the user may be changing the angle by moving the camera by panning, tilting, zooming, or the like, in which cases the probability that the subject distance has changed is high, and is performed to prevent erroneous icon display.

In the event that there is no shaking, the flow proceeds to step S713, and either the macro icon or the magnifying glass icon is displayed. This sort of display control enables erroneous icon display to be prevented in cases of the user changing the angle by moving the camera by panning, tilting, zooming, or the like.

Figure 21:
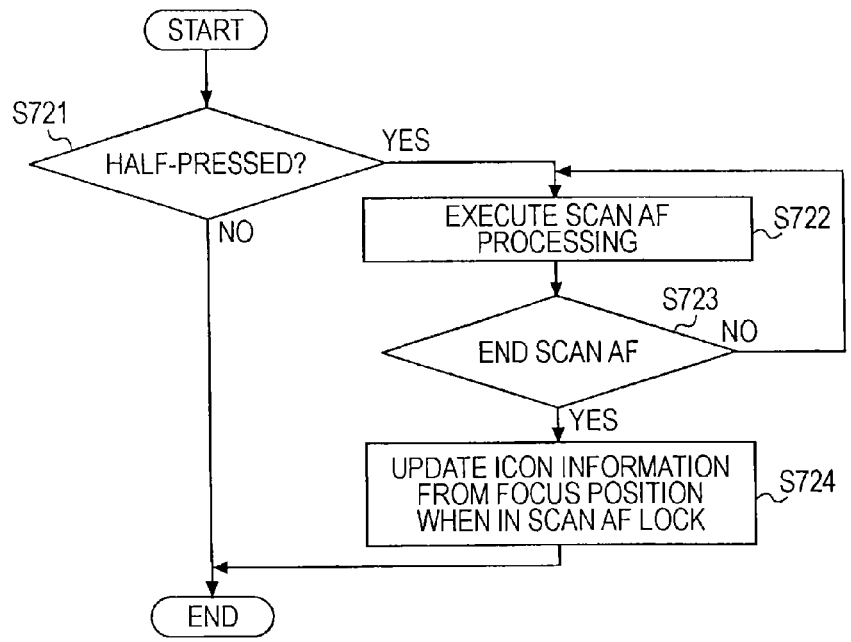
FIG. 21 is a flowchart for describing an icon display control processing sequence in auto-focus (AF) processing.

Next, icon display control processing in a case of auto-focus (AF) scanning processing will be described with reference to the flowchart in FIG. 21. In the event that half-pressing of the shutter button by the user is detected in step S721, in step S722 auto-focus (AF) scanning processing is started. In the event that determination is made in step S723 that the auto-focus (AF) scanning processing has ended, in step S724 updating processing of icon information is started in accordance with the focus position locked in the auto-focus (AF) scanning processing.

Figure 22:
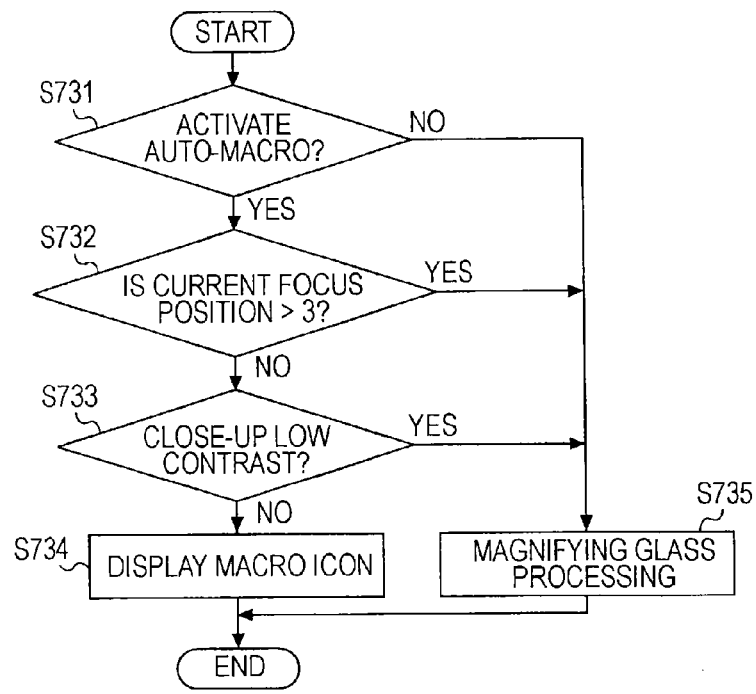
FIG. 22 is a flowchart for describing an icon display control processing sequence in auto-focus (AF) processing.

The detailed sequence of updating processing of icon information in step S724 will be described with reference to the flowchart shown in FIG. 22. In step S731, determination is made regarding whether or not the settings are for executing auto-macro. If not, the magnifying glass processing in step S735 is performed. Details of magnifying glass processing will be described later with reference to the flowchart in FIG. 23.

In the event that the settings are found to be for performing auto-macro in step S731, the flow proceeds to step S732, the current focus position is verified, and determination is made regarding whether or not the position of the focusing lens is in the region 4 sectioned by the cam curves shown in FIG. 16. If in region 4, the magnifying glass processing in step S735 is performed. Otherwise, the flow proceeds to step S733.

In step S733, determination is made regarding whether or not the near region is low contrast, i.e., regarding whether or not a focus point has been detected, and if not, the magnifying glass processing in step S735 is performed. Otherwise, the flow proceeds to step S734, and the macro icon indicating the macro region is displayed.

Figure 23:
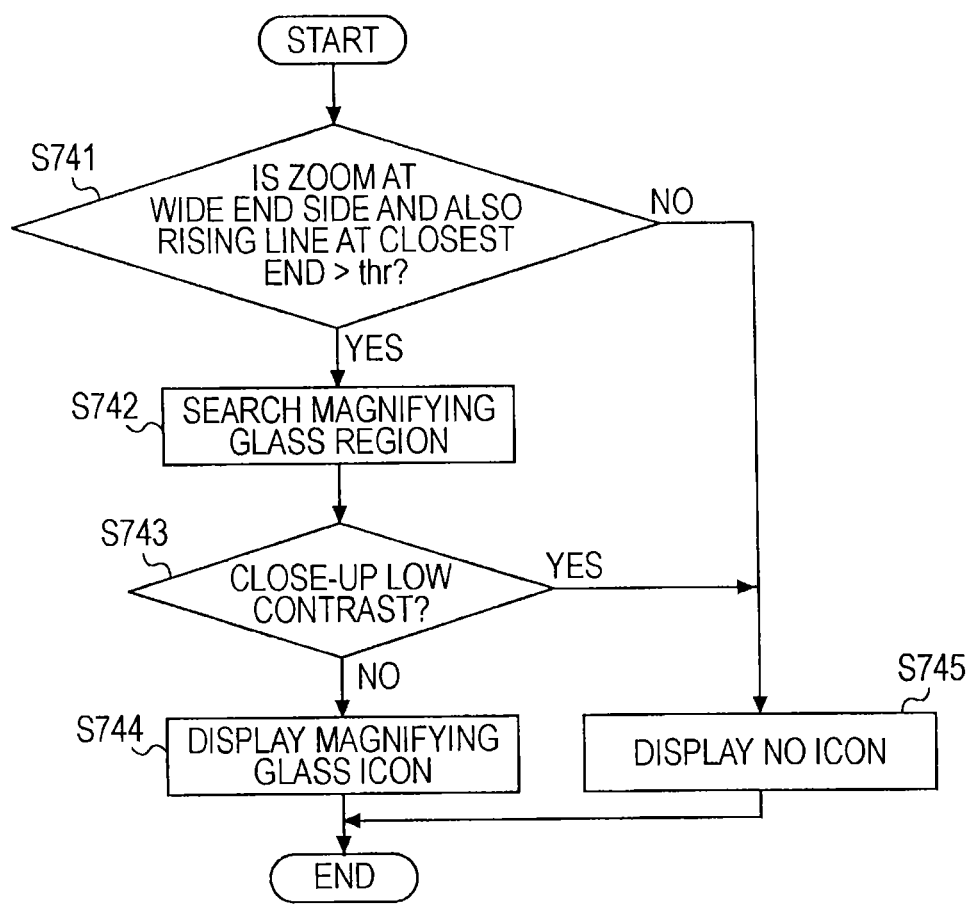
FIG. 23 is a flowchart for describing an icon display control processing sequence in auto-focus (AF) processing.

Next, details of the magnifying glass processing of step S735 shown in FIG. 22 will be described with reference to the flowchart in FIG. 23. First, in step S741, determination is made regarding whether or not the zoom lens is at the wide end side, and also the rising line of the near end curve at the time of auto-focus (AF) scanning processing is above a preset threshold (thr). If No, the focus point cannot be clearly determined, so the flow proceeds to step S745 and the icon is not displayed.

In the event that the determination in step S741 is Yes, the flow proceeds to step S742. In step S742, magnifying glass search processing, i.e., auto-focus (AF) scanning processing is executed in the magnifying glass region to detect a focus point based on contrast detection. In the event that determination is made regarding that no focus point has been detected in step S743, i.e., in the event that determination is made of a low contrast state, the flow proceeds to step S745 and the icon is not displayed.

In the event that determination is made regarding that a focus point has been detected in step S743, the flow proceeds to step S744, where the magnifying glass icon is displayed.

Figure 24:
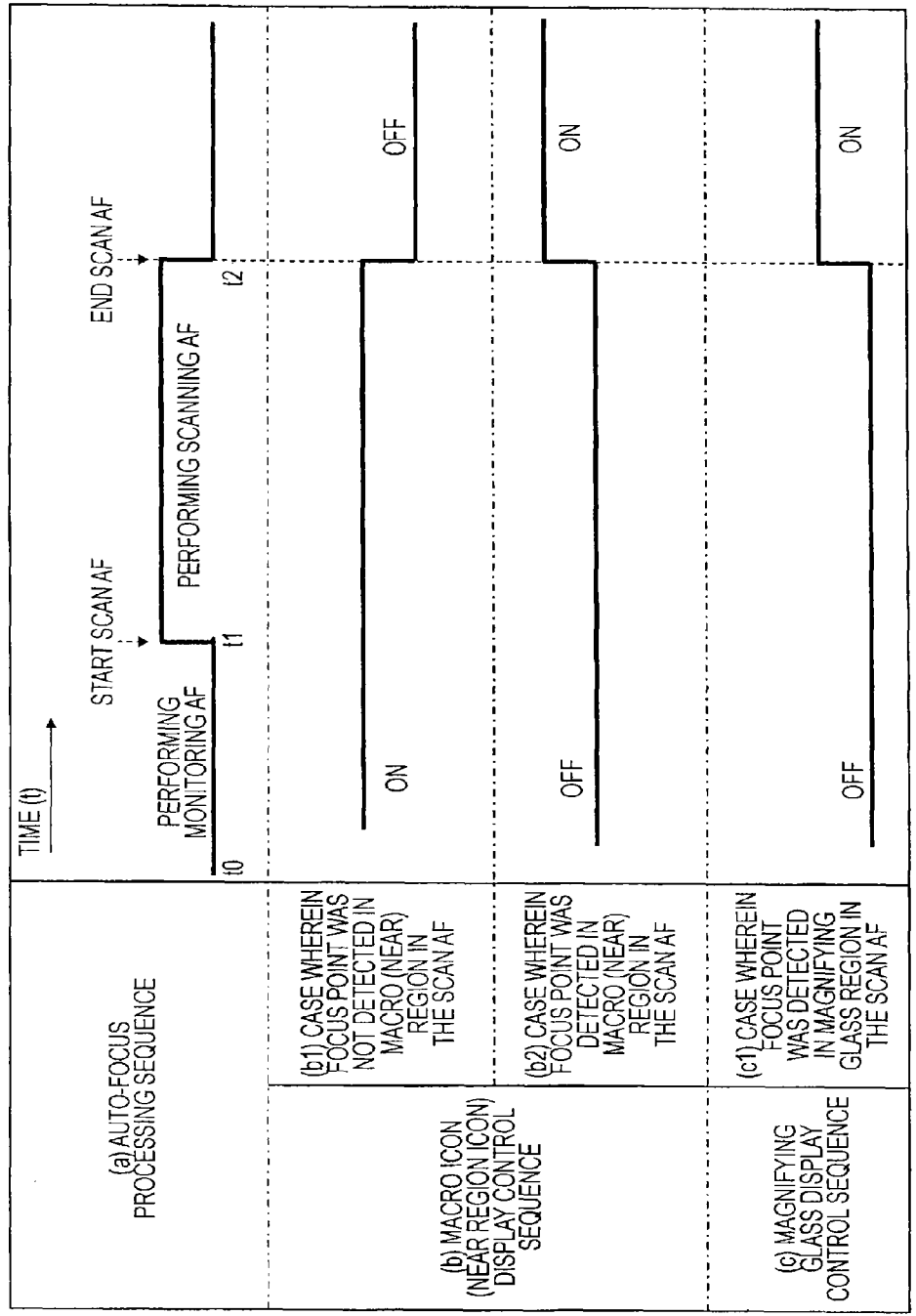
FIG. 24 is a diagram for describing an icon display control processing sequence in auto-focus (AF) processing.

Icon display control is performed such as described above, and the sequences of such icon display control will be described with reference to FIG. 24. FIG. 24 is a diagram for describing sequences for on (display) and off (non-display) of these icons in a case wherein AF processing following the auto-focus sequence shown in (a) is performed, for (b) display control of the macro icon, and (c) display control of the magnifying glass icon. Time (t) flows from the left to the right of the drawing.

As shown in (a), with auto-focus processing, time t0 through t1 is the monitoring auto-focus (AF) processing period, i.e., a period for performing auto-focus processing based on monitor images. Subsequently, time t1 through t2 is the auto-focus (AF) scanning period. This is equivalent to the half-press period of the shutter button, for example. From time t2 on, the shutter button is full-pressed and a picture is shot.

In this sequence, the (b) display control of the macro icon is performed as follows, for example. The drawing shows the two following examples of processing, which are (b1) case wherein focus point has not been detected in the macro (near) region during the auto-focus (AF) scanning processing at time t1 through t2, and (b2) case wherein focus point has been detected in the macro (near) region during the auto-focus (AF) scanning processing at time t1 through t2.

In the case of (b1), even though the macro icon has been displayed (On) up to the time of completion of the auto-focus (AF) scanning processing in time t0 through t2, no focus point has been detected in the macro (near) region during the auto-focus (AF) processing, so the macro icon is not displayed (Off) at the point of time t2.

In the case of (b2), even though the macro icon has not been displayed (Off) up to the time of completion of the auto-focus (AF) scanning processing in time t0 through t2, a focus point has been detected in the macro (near) region during the auto-focus (AF) processing, so the macro icon is displayed (On) at the point of time t2.

Also, (c) is an example of a magnifying glass icon display control sequence. In the case in (c1), even though the macro icon has not been displayed (Off) up to the time of completion of the auto-focus (AF) scanning processing in time t0 through t2, no focus point has been detected in the magnifying glass region during the auto-focus (AF) scanning processing, so the magnifying glass icon is displayed (On) at the point of time t2.

AF Illuminator Output Control

Next, AF illuminator control processing performed with the imaging apparatus according to an embodiment of the present invention will be described. As described earlier with reference to FIGS. 1 and 2, the control unit 110 of the imaging apparatus inputs measurement information from the illuminance meter unit, determines whether or not the shooting environment is a low illuminance environment, and in the event that the shooting environment is a low illuminance environment performs control to cast light on the subject by controlling the AF illuminator emission unit 25 for casting light on the subject in the event that the shooting environment is a low illuminance environment.

However, many cameras according to the related art are configured to perform photography emitting light of the same intensity regardless of whether the subject is in the macro region or magnifying glass region, or the normal far region, meaning that the light is often excessive when in the macro region or magnifying glass region, and further electric power is excessively consumed.

The control unit 110 of the imaging apparatus according to the present embodiment executes control for inputting the distance information to the subject, and changing the AF illuminator emission intensity in accordance with the distance information. Specifically, level control is performed such that
(a) low-level emission is performed in the case that the subject is in the magnifying glass region,
(b) mid-level emission is performed in the case that the subject is in the macro (near) region, and
(c) high-level emission is performed in the case that the subject is in the far region.

Figure 25:
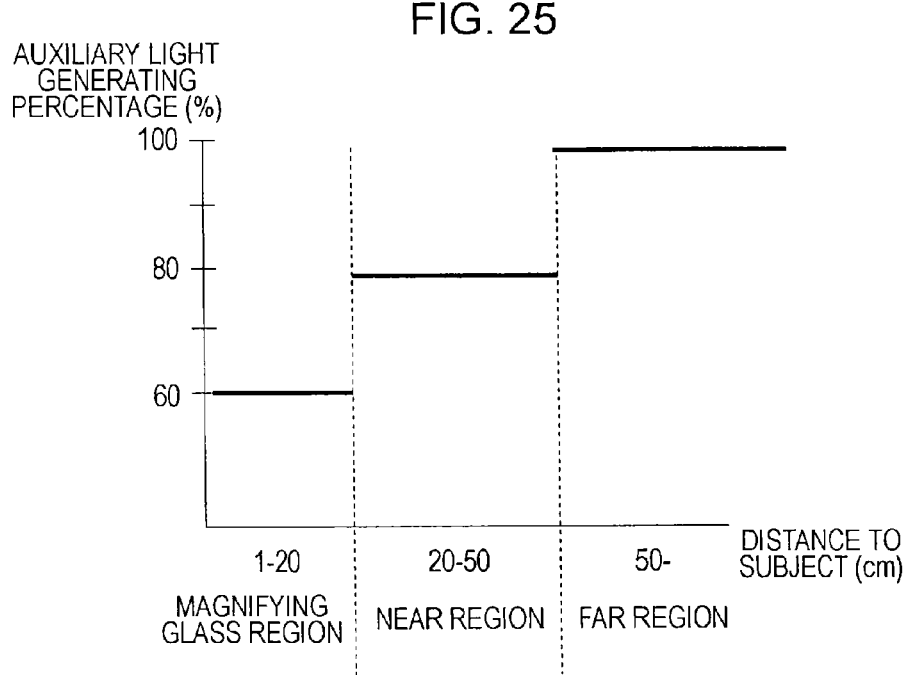
FIG. 25 is a diagram for describing AF illuminator emission control processing.

Specifically, as shown in FIG. 25 for example, level control is performed such that
(a) low-level emission with AF illuminator emission of 60% is performed in the case that the subject is in the magnifying glass region,
(b) mid-level emission with AF illuminator emission of 80% is performed in the case that the subject is in the macro (near) region, and
(c) high-level emission with AF illuminator emission of 100% is performed in the case that the subject is in the far region.

Note that the AF illuminator emission percentages in accordance with the subject distance information are stored in memory as a table beforehand, with the controlling unit determining the AF illuminator emission percentage by referring the table in accordance with the subject distance information obtained in the monitoring auto-focus or processing auto-focus scanning processing.

Figure 26:
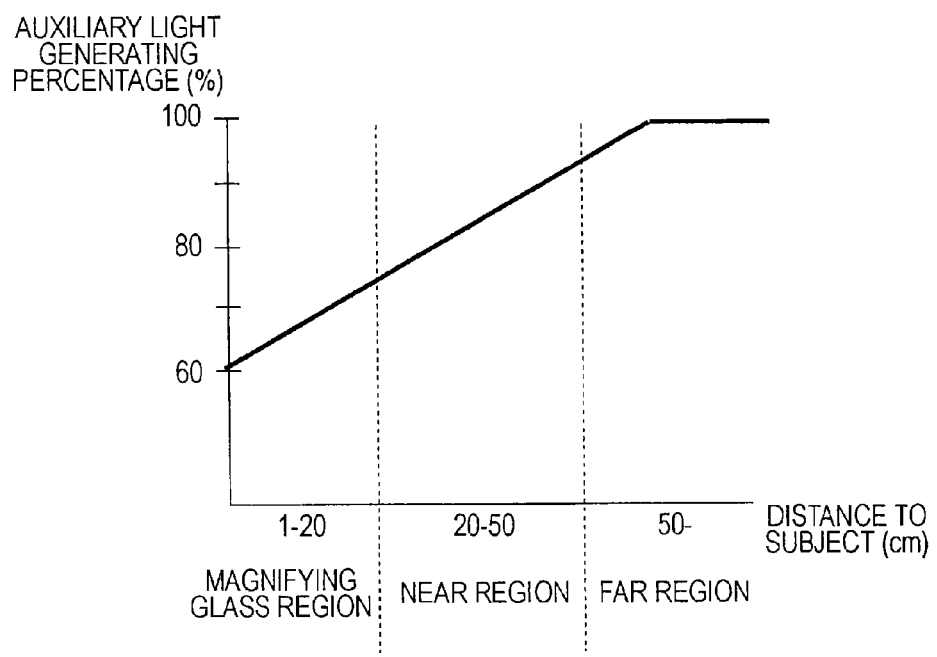
FIG. 26 is a diagram for describing AF illuminator emission control processing.

Alternatively, as shown in FIG. 26, a table may be set wherein the AF illuminator emission percentage is smoothly increased over a range of 60% to 100% in accordance with the distance to the subject, with control being performed using such a table.

In the event that the distance to the subject is short, the subject can be brightly illuminated even if the AF illuminator is low-level, without lowering the image quality of the shot image. This processing can conserve electric power consumption, and reduce battery use.

Figure 27:
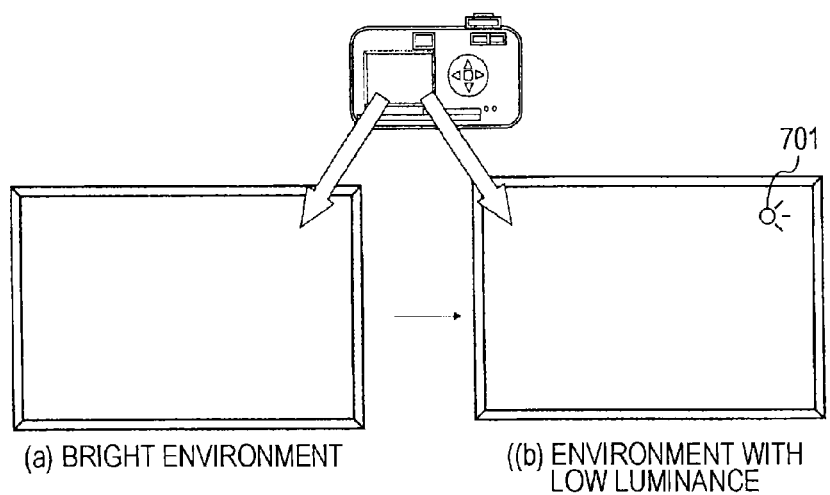
FIG. 27 is a diagram for describing an example of icon display processing in the AF illuminator emission control processing.
Figure 28:
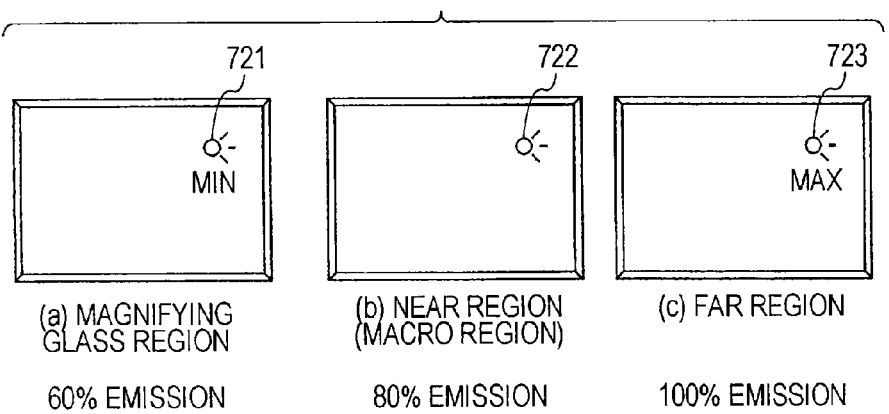
FIG. 28 is a diagram for describing an example of icon display processing in the AF illuminator emission control processing.

Note that the control unit 110 measures the luminance during monitoring before the user half-pressing the shutter button, so as to determine whether or not to emit AF illuminator, based on the measured luminance. Further, in the event of determining to emit the AF illuminator, the control unit displays the AF illuminator icon on the monitor screen. An example is the AF illuminator icon 701 such as shown in FIG. 27. This acts to notify the user that half-pressing the shutter button while this icon is lit will result in AF illuminator being emitted.

Applying this to the above arrangement, icons may be shown so that the user can recognize the level control being performed with regard to emission intensity, according to the above-described emission control state, such that
(a) an icon 721 indicates low-level emission with AF illuminator emission of 60% will be performed in the case that the subject is in the magnifying glass region,
(b) an icon 722 indicates mid-level emission with AF illuminator emission of 80% will be performed in the case that the subject is in the macro (near) region, and
(c) an icon 723 indicates high-level emission with AF illuminator emission of 100% will be performed in the case that the subject is in the far region.

Note that the present invention can be applied to a variety of equipment, such as a digital camera, digital video camera, cell phone with a built-in camera, and so forth.

As described above, description has been made in detail regarding the present invention with reference to the specific embodiments. Note however, it is clearly evident that one skilled in the art can perform various modifications and alternations of the embodiments without departing from the essence of the present invention. That is to say, the present invention has been disclosed exemplarily, and is not to be interpreted restrictively. The Claims should be referred to in order to determine the essence of the present invention.

Also, the series of processing described in the present Specification may be executed by hardware, or software, or a compound arrangement of both. In a case of executing the processing by software, a program in which the processing sequence is recorded may be installed for execution in memory within a computer embedded in dedicated hardware, or the program may be installed for execution in a general-purpose computer which can execute various types of processing. For example, the program may be recorded in a recording medium beforehand. The program may be installed in a computer from the recording medium, and also may be received through a network such as a LAN (Local Area Network) or the Internet, and installed in a recording medium such as a built-in hard disk or the like.

Note that the various types of processing described in the present Specification may be executed not only in time-sequence following the order laid forth but also in parallel or individually according to the processing capabilities of a device for executing the processing or as appropriate. Also, with the present Specification, the term "system" represents a logical group arrangement of multiple devices, which is not restricted to an arrangement wherein the devices each having an individual configuration are housed in the same casing.

It should be understood by those skilled in the art that various modifications, combinations, sub-combinations and alterations may occur depending on design requirements and other factors insofar as they are within the scope of the appended claims or the equivalents thereof.

What is claimed is:

1. A display controlling apparatus comprising:
   a detection unit configured to detect a distance between an object in a captured image and the apparatus, the detection unit determining the distance based on a height of the object in the captured image and a height of the captured image; and
   a display control unit configured to control a display unit to display information based on the distance, the display control unit configured to control the display unit to change a display status of the information in a case that a movement of the apparatus is detected.

2. The apparatus according to claim 1, wherein the display control unit controls the display unit to display information including an icon based on the distance.

3. The apparatus according to claim 2, wherein the display control unit controls the display unit to display information including a magnifying glass icon when the distance is below a first threshold.

4. The apparatus according to claim 3, wherein the display control unit controls the display unit to display information including a macro icon when the distance is between the first threshold and a second threshold greater than the first threshold.

5. The apparatus according to claim 4, wherein the display control unit controls the display unit to display no icon when the distance is greater than the second threshold.

6. The apparatus according to claim 5, wherein the display control unit controls the display unit to remove the macro icon when the distance changes from below the second threshold to above the second threshold.

7. The apparatus according to claim 1, wherein the detecting unit determines the distance according to the following formula:

$$d = fl \times h_s / 1000 h_i,$$

where d is the distance between the object and the apparatus, fl is a focal length of the image, $h_s$ is the height of the object, and $h_i$ is the height of the captured image.

8. A method comprising:
   detecting a distance between an object in a captured image and the apparatus, the detecting including determining the distance based on a height of the object in the captured image and a height of the captured image;
   controlling a display unit to display information based on the distance; and
   controlling the display unit to change a display status of the information in a case that a movement of the apparatus is detected.

9. The method according to claim 8, further comprising:
   controlling the display unit to display information including an icon based on the distance.

10. The method according to claim 9, further comprising:
    controlling the display unit to display information including a magnifying glass icon when the distance is below a first threshold.

11. The method according to claim 10, further comprising:
    controlling the display unit to display information including a macro icon when the distance is between the first threshold and a second threshold greater than the first threshold.

12. The method according to claim 11, further comprising:
    controlling the display unit to display no icon when the distance is greater than the second threshold.

13. The method according to claim 12, further comprising:
    controlling the display unit to remove the macro icon when the distance changes from below the second threshold to above the second threshold.

14. The method according to claim 8, wherein the detecting includes determining the distance according to the following formula:

$$d = fl \times h_s / 1000 h_i,$$

where d is the distance between the object and the apparatus, fl is a focal length of the image, $h_s$ is the height of the object, and $h_i$ is the height of the captured image.

15. A non-transitory computer readable medium encoded with computer instructions that, when loaded on a processor, cause the processor to perform a method comprising:
    detecting a distance between an object in a captured image and the apparatus, the detecting including determining the distance based on a height of the object in the captured image and a height of the captured image;
    controlling a display unit to display information based on the distance; and
    controlling the display unit to change a display status of the information in a case that a movement of the apparatus is detected.

16. The medium according to claim 15, wherein the method further comprises:
    controlling the display unit to display information including an icon based on the distance.

17. The medium according to claim 16, wherein the method further comprises:
    controlling the display unit to display information including a magnifying glass icon when the distance is below a first threshold.

18. The medium according to claim 17, wherein the method further comprises:
    controlling the display unit to display information including a macro icon when the distance is between the first threshold and a second threshold greater than the first threshold.

19. The medium according to claim 18, wherein the method further comprises:
    controlling the display unit to display no icon when the distance is greater than the second threshold.

20. The medium according to claim 19, wherein the method further comprises:
    controlling the display unit to remove the macro icon when the distance changes from below the second threshold to above the second threshold.

21. The medium according to claim 15, wherein the detecting includes determining the distance according to the following formula:

$$d = fl \times h_s / 1000 h_i,$$

where d is the distance between the object and the apparatus, fl is a focal length of the image, $h_s$ is the height of the object, and $h_i$ is the height of the captured image.

22. A display controlling apparatus comprising:
    a detection unit configured to detect a distance between an object in a captured image and the apparatus; and a display control unit configured to control a display unit to display information relevant to the distance, the display control unit configured to control the display unit to remove the information in a case that a movement of the apparatus is detected.

23. A display controlling method comprising:

detecting a distance between an object in a captured image and the apparatus;

controlling a display unit to display information relevant to the distance; and controlling the display unit to remove the information in a case that a movement of the apparatus is detected.

* * * * *